United States Patent
Ohashi et al.

(10) Patent No.: US 8,262,539 B2
(45) Date of Patent: Sep. 11, 2012

(54) POWER TRANSMITTING APPARATUS

(75) Inventors: Tatsuyuki Ohashi, Shizuoka (JP); Shouji Asatsuke, Shizuoka (JP); Akio Oishi, Shizuoka (JP); Ryouhei Chiba, Shizuoka (JP); Jun Ishimura, Shizuoka (JP); Keiichi Ishikawa, Shizuoka (JP)

(73) Assignee: Kabushiki Kaisha F.C.C., Shizuoka (JP)

( * ) Notice: Subject to any disclaimer, the term of this patent is extended or adjusted under 35 U.S.C. 154(b) by 0 days.

(21) Appl. No.: 13/092,035

(22) Filed: Apr. 21, 2011

(65) Prior Publication Data

US 2011/0237389 A1    Sep. 29, 2011

Related U.S. Application Data

(63) Continuation of application No. PCT/JP2009/005504, filed on Oct. 21, 2009.

(30) Foreign Application Priority Data

Oct. 22, 2008   (JP) ................................. 2008-271644

(51) Int. Cl.
  *F16H 61/48*   (2006.01)
(52) U.S. Cl. ........................................................ 477/57
(58) Field of Classification Search .................. 192/3.25, 192/3.27, 48.611, 48.618; 477/174, 175, 477/180, 171, 71, 80, 76
  See application file for complete search history.

(56) References Cited

U.S. PATENT DOCUMENTS

| | | | |
|---|---|---|---|
| 6,378,675 B1 * | 4/2002 | Kundermann et al. | 192/3.27 |
| 6,454,074 B1 * | 9/2002 | Kundermann et al. | 192/48.618 |
| 6,698,202 B2 * | 3/2004 | Ogiwara et al. | 60/578 |
| 6,991,078 B2 * | 1/2006 | Leber | 192/3.27 |
| 7,171,867 B2 * | 2/2007 | McCrary et al. | 74/331 |
| 7,189,187 B2 * | 3/2007 | Nakayashiki et al. | 477/159 |
| 7,356,400 B2 * | 4/2008 | Honma et al. | 701/67 |
| 7,798,299 B2 * | 9/2010 | Schultz | 192/3.27 |
| 2006/0212204 A1 | 9/2006 | Honma et al. | |

FOREIGN PATENT DOCUMENTS

| | | |
|---|---|---|
| JP | 2005-003193 | 1/2005 |
| WO | WO 2008/041620 | 4/2008 |

* cited by examiner

*Primary Examiner* — David D Le
*Assistant Examiner* — David J Hlavka
(74) *Attorney, Agent, or Firm* — Knobbe, Martens, Olson & Bear, LLP

(57) ABSTRACT

A power transmitting apparatus, such an automotive transmission, adapted to properly select transmission of or cutting-off of a driving force of the driving source to or from the wheels of a vehicle can include a torque converter having a torque amplifying function. A clutch mechanism can include a first clutch device configured to transmit the driving force to the wheels through the torque converter and a second clutch device configured to transmit the driving force without passing through the torque converter. A selecting device can control the first clutch device or the second clutch device in accordance with conditions of the vehicle including starting from a stop. An input-side measuring device can be used to measure an input-side rotational speed of the first clutch device and an output-side measuring device can be used for measuring an output-side rotational speed of the first clutch device. A slip ratio calculating device can be used to calculate the slip ratio of the first clutch device from the difference or the ratio between the rotational speed measured by the input-side measuring device and the rotational speed measured by the output-side measuring device.

16 Claims, 19 Drawing Sheets

[Fig 1]
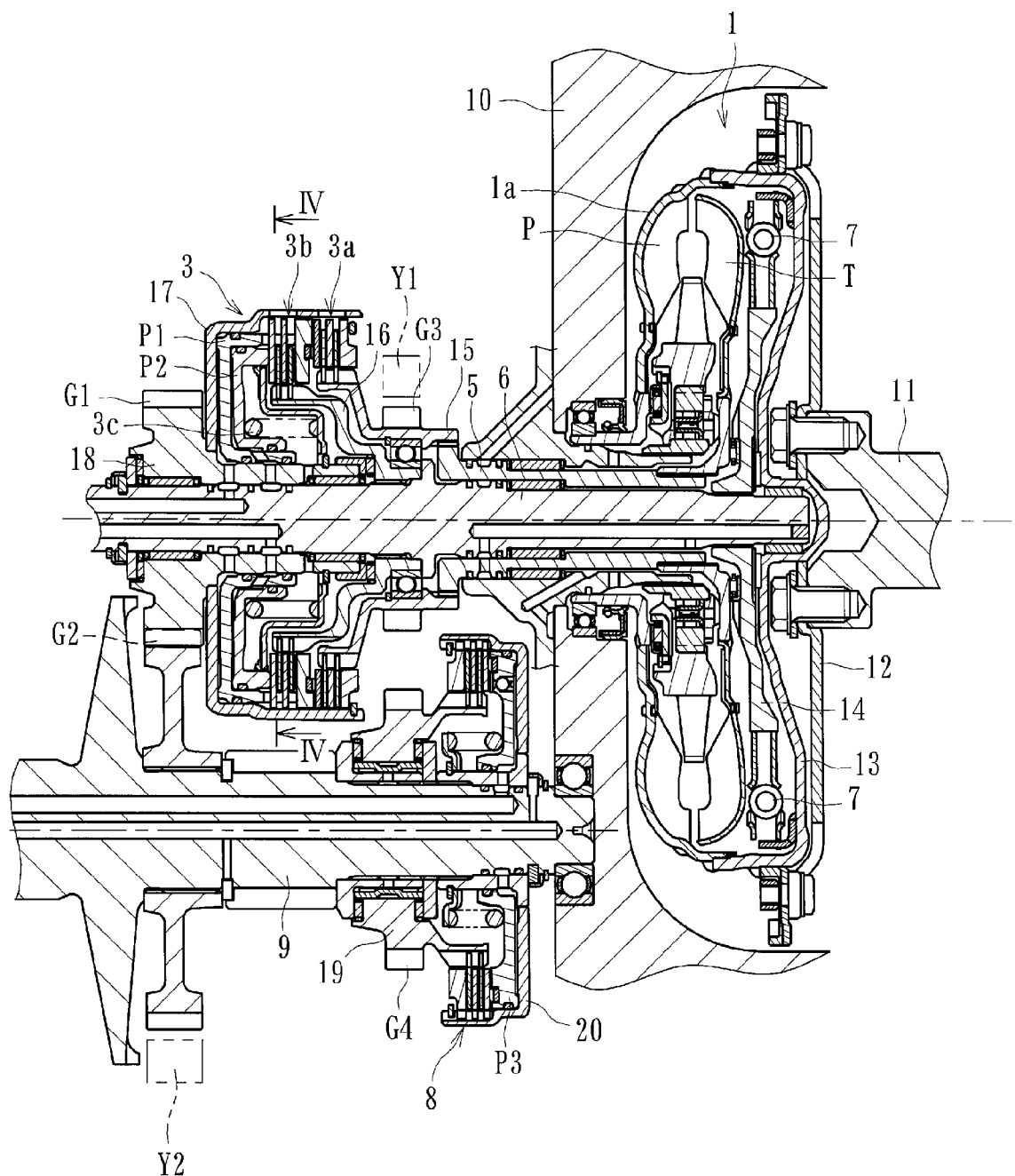

[Fig 2]
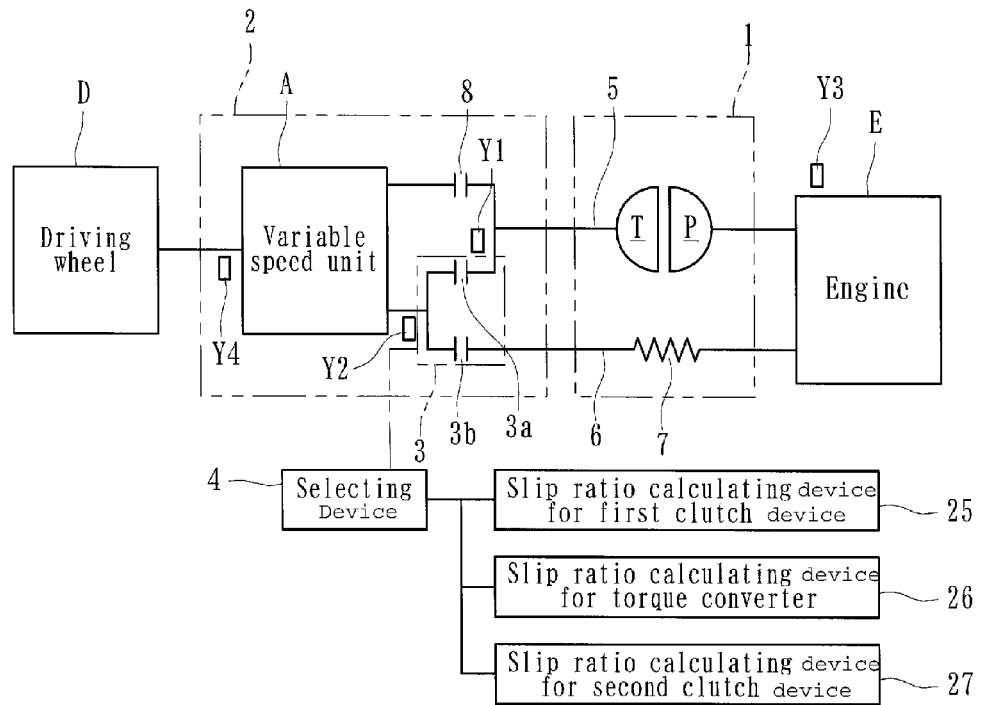
[Fig 3]
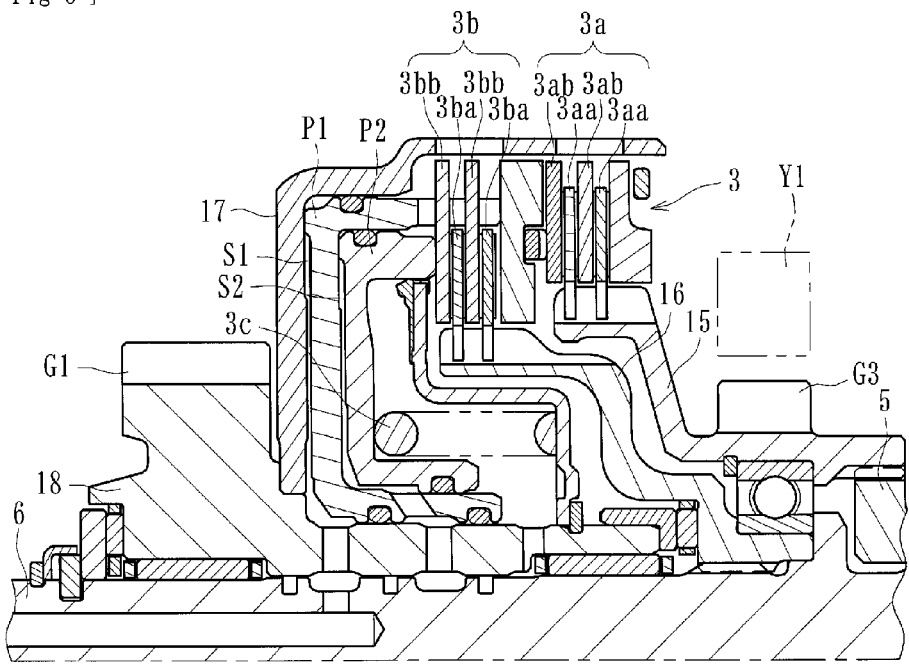

[Fig 4]
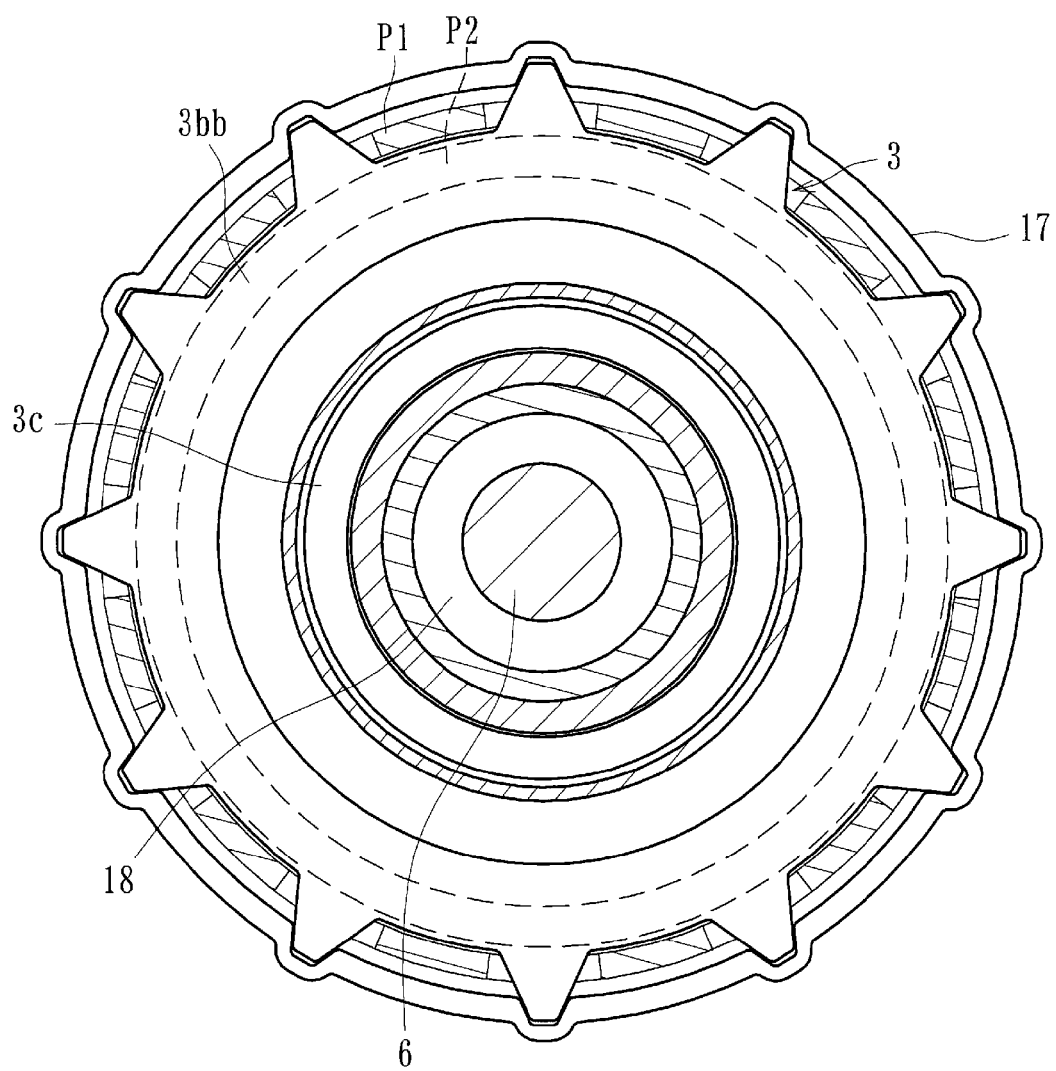

[Fig 5]
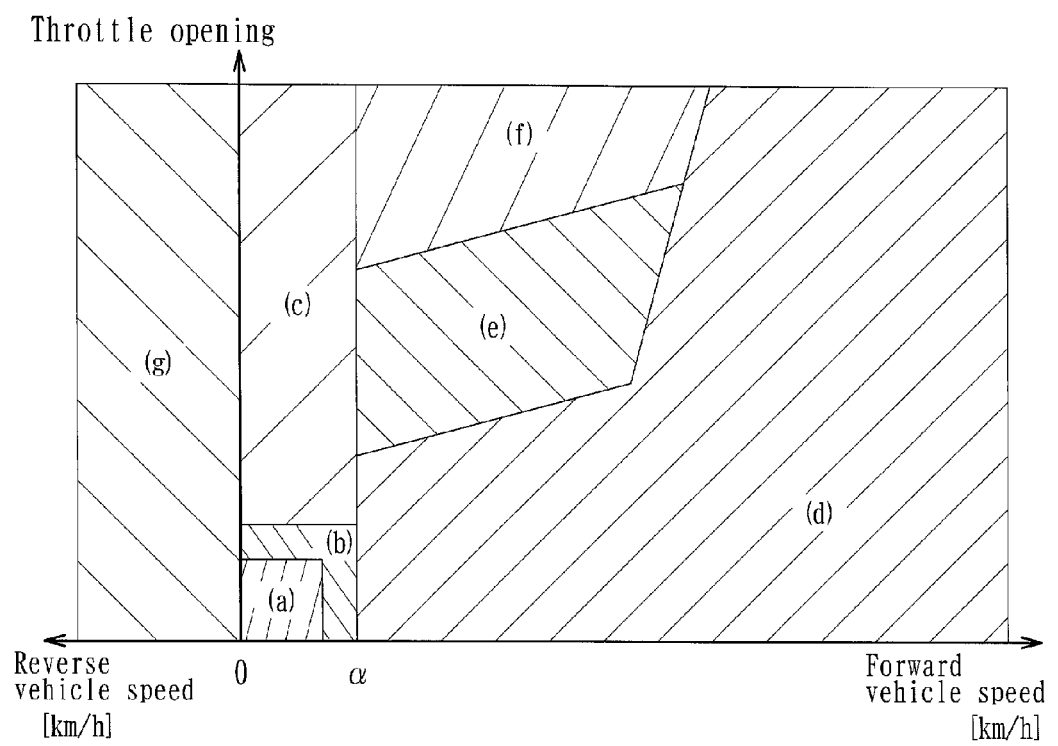

[Fig 6]
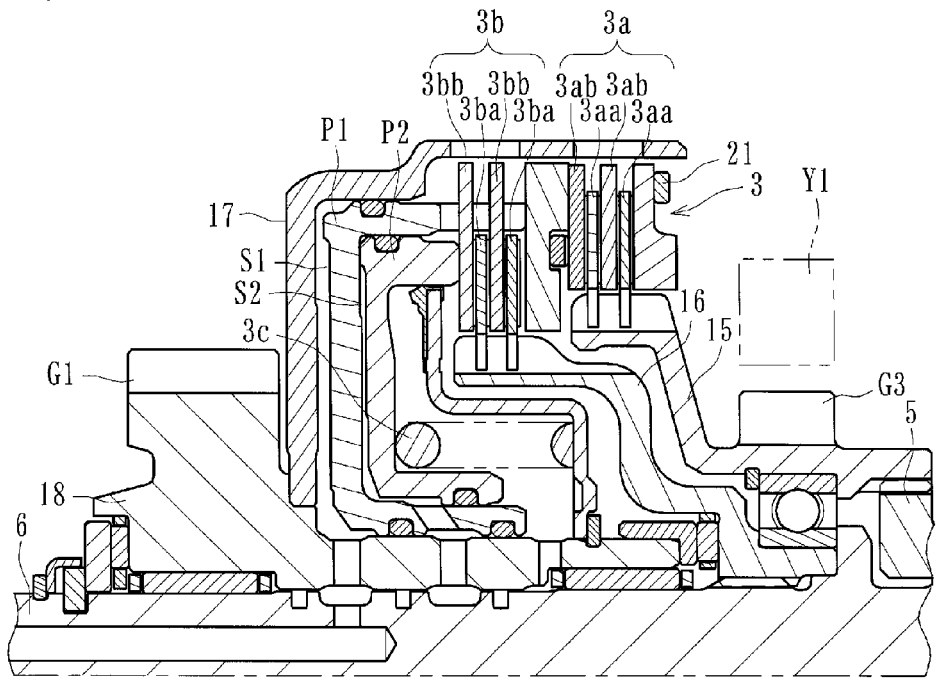
[Fig 7]
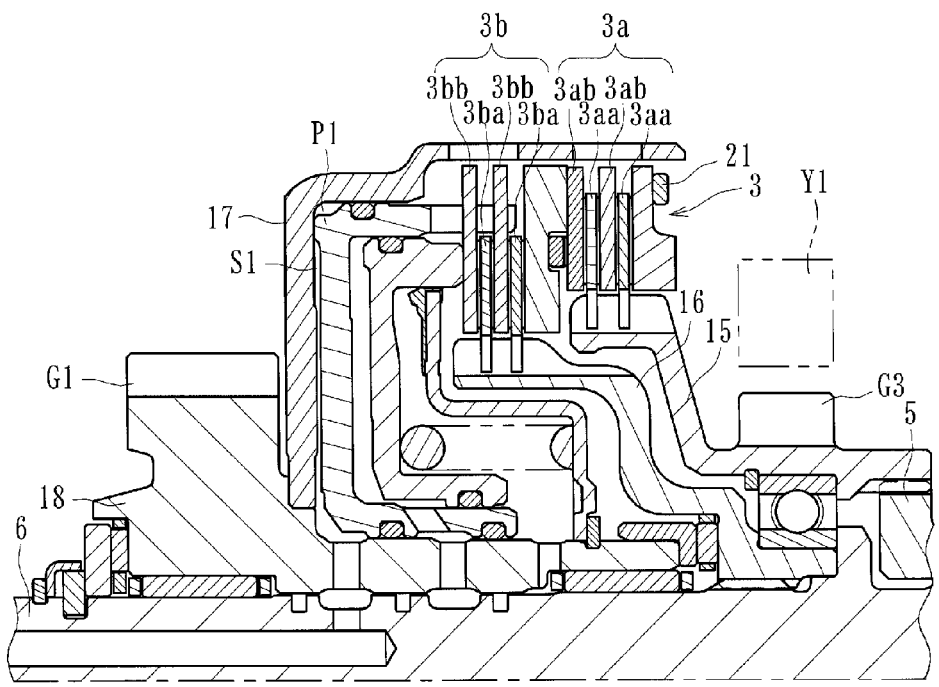

[Fig 8]
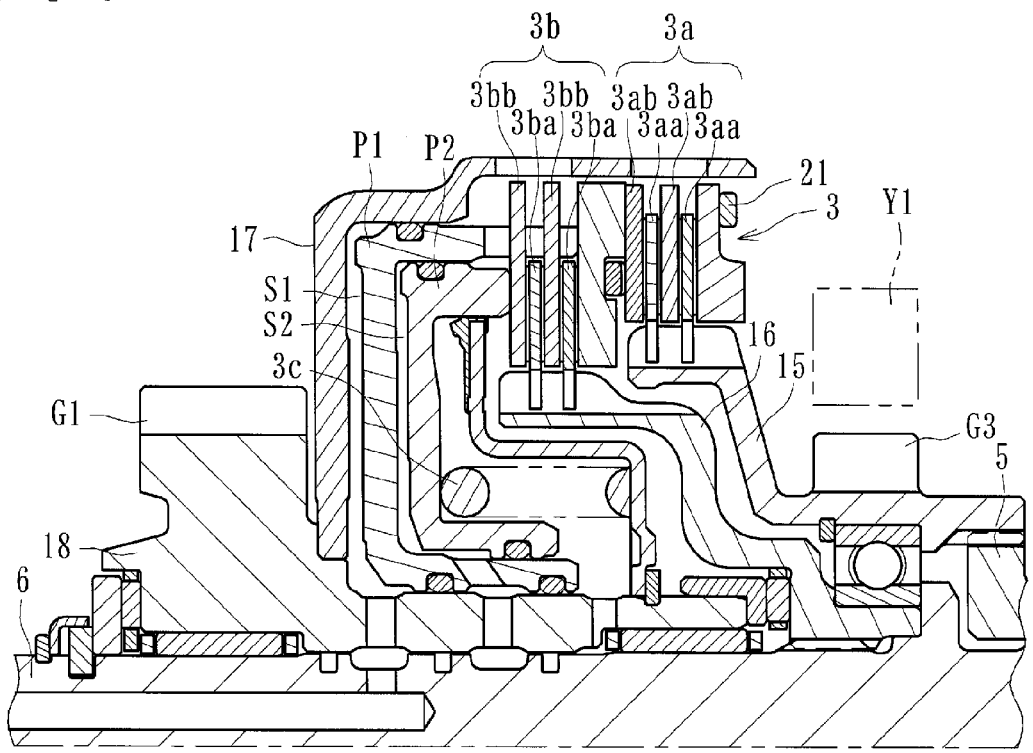
[Fig 9]
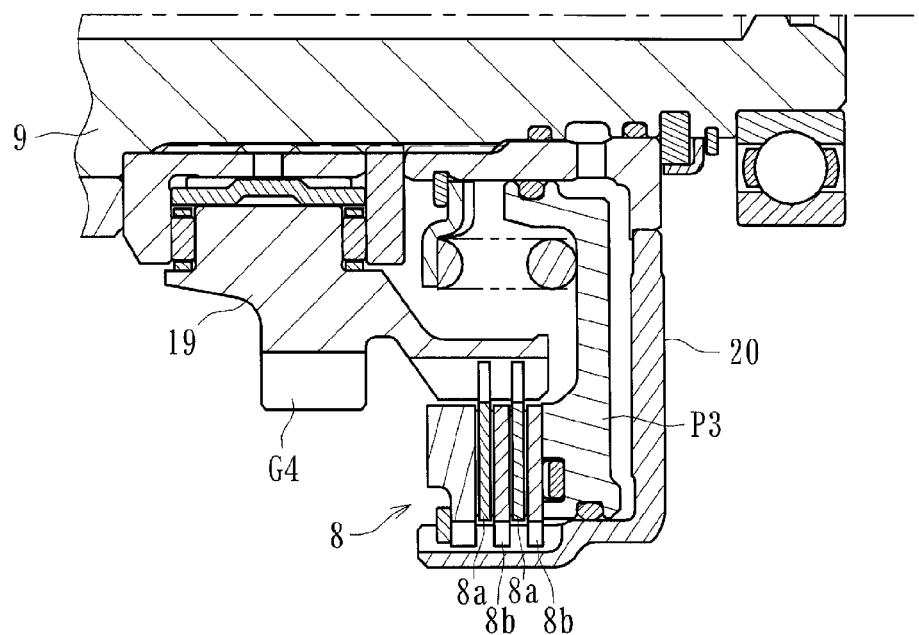

[Fig 10]
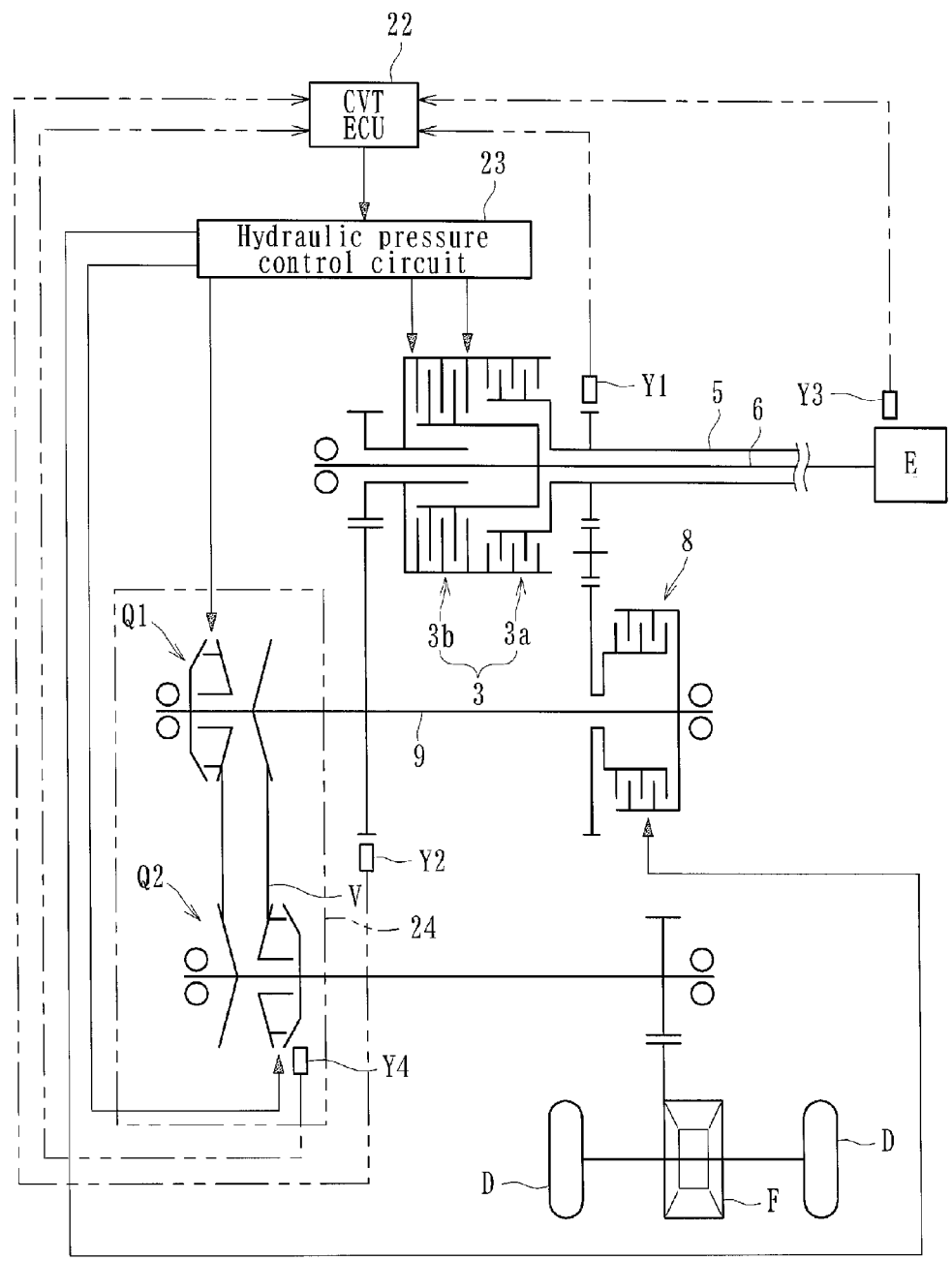

[Fig 11]
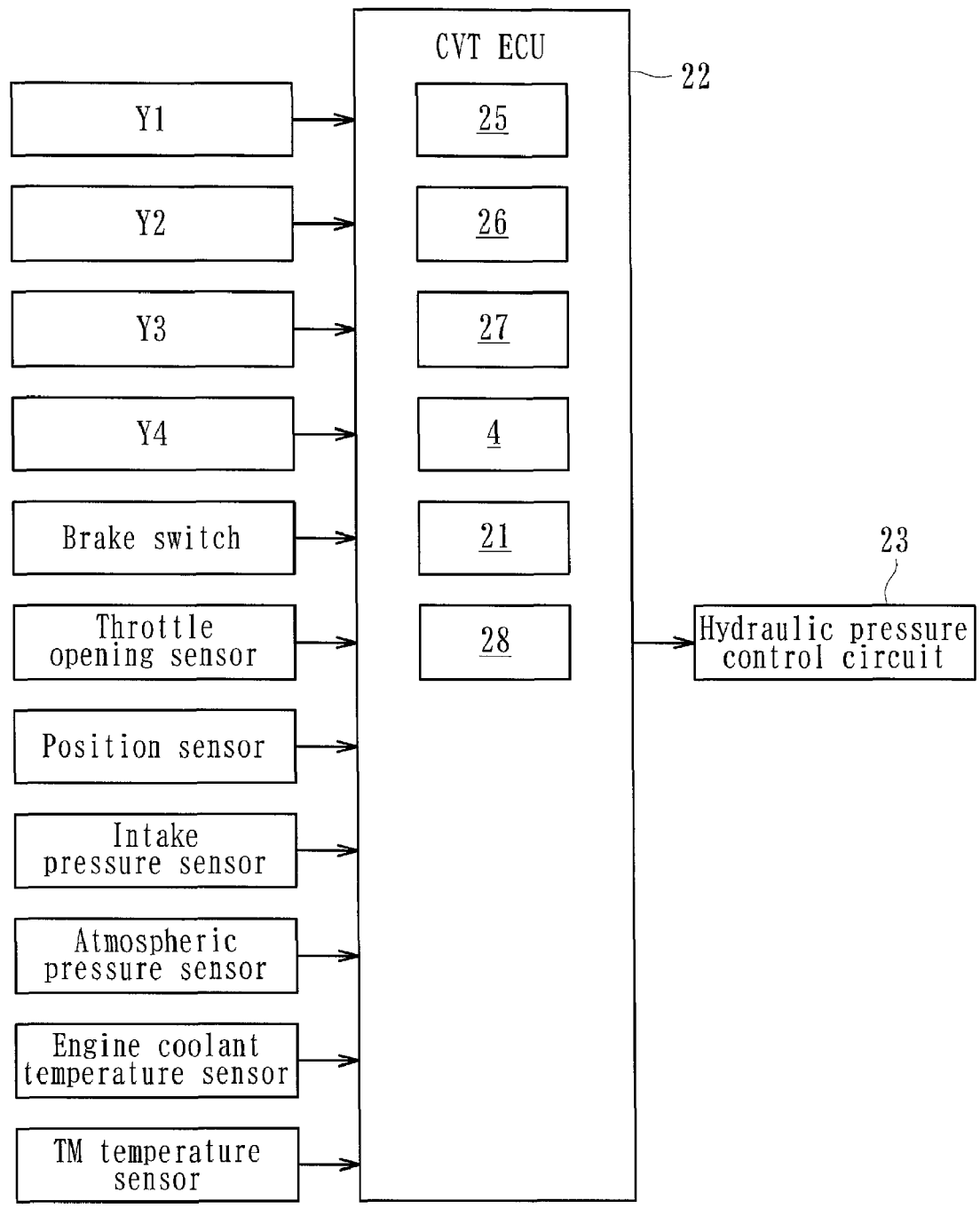

[ Fig 12 ]
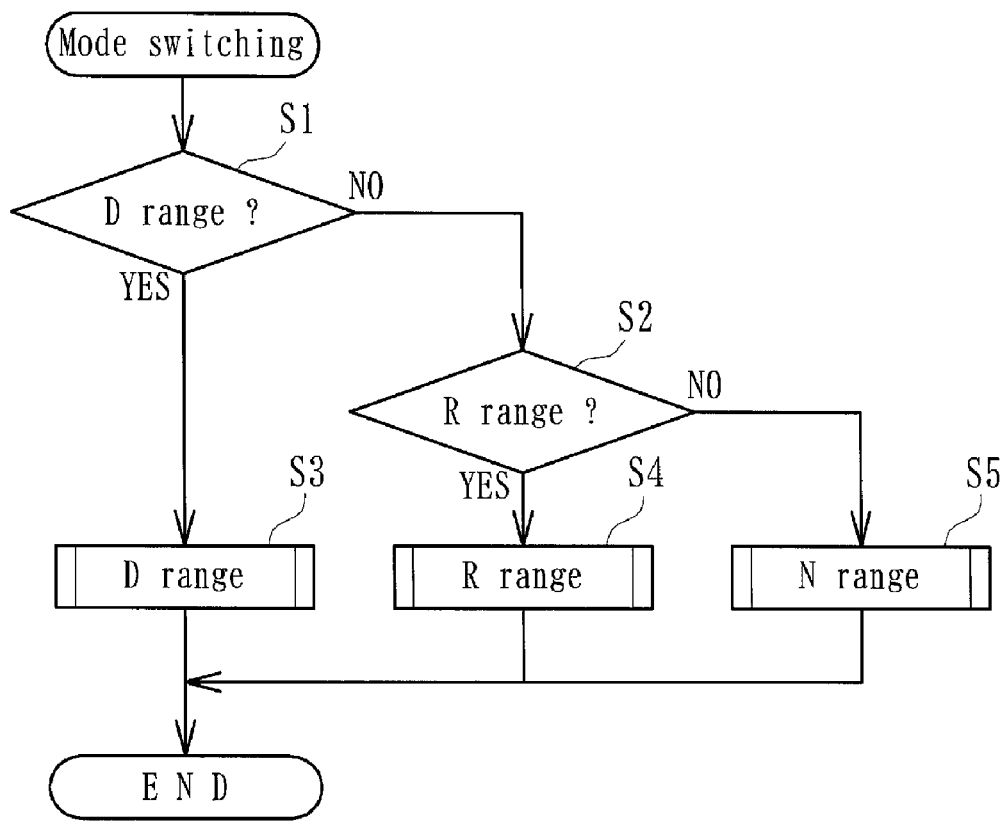
[ Fig 13 ]
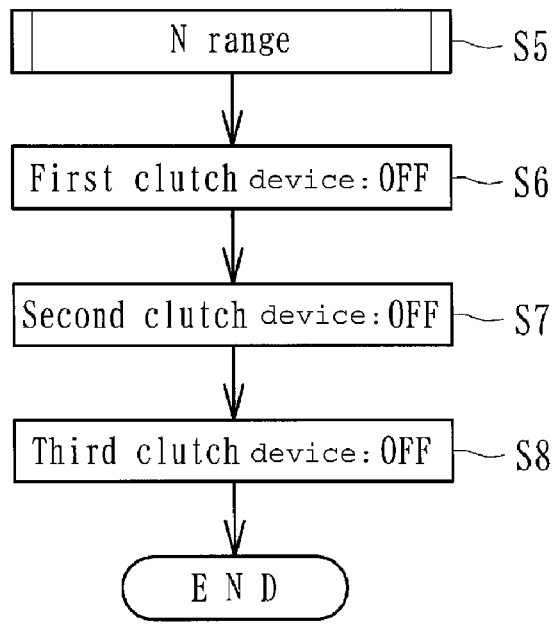

[Fig 14]
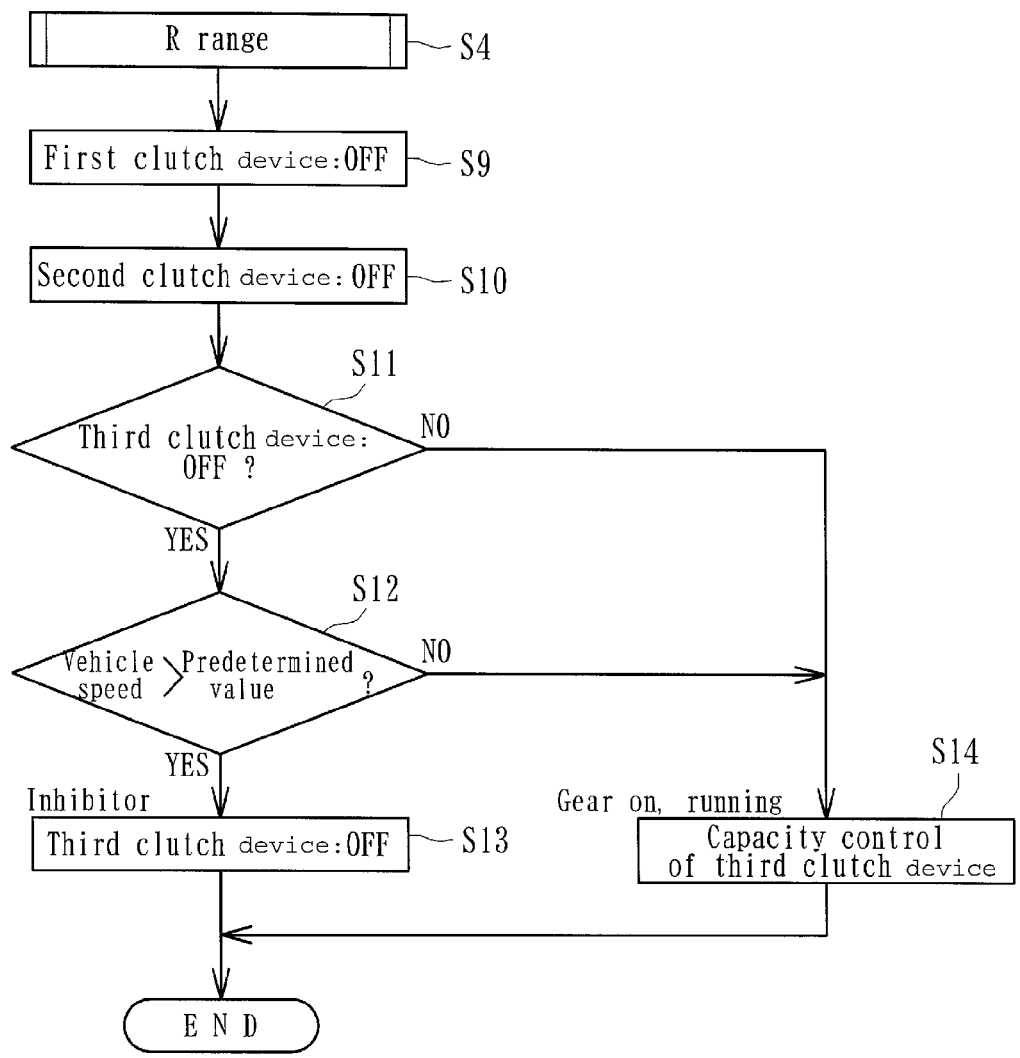

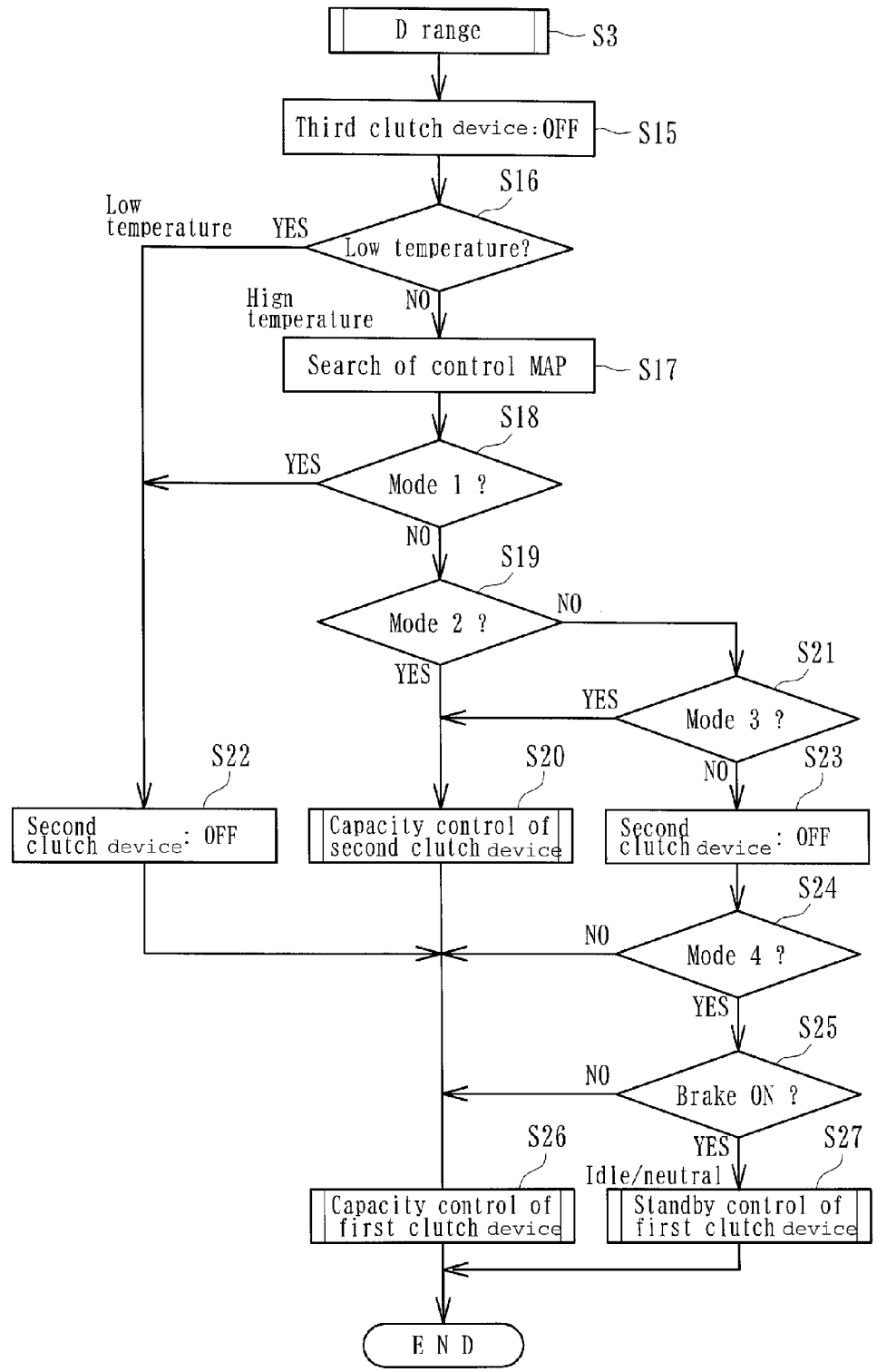
[Fig 15]

[Fig 16]
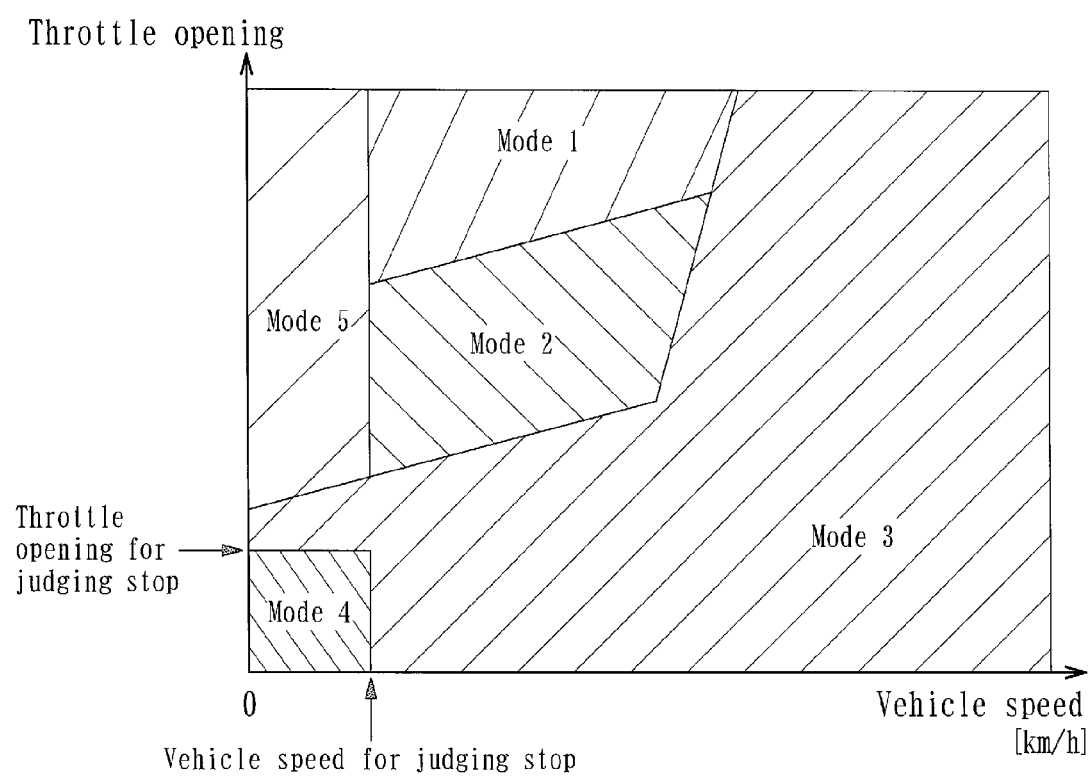

[Fig 17]
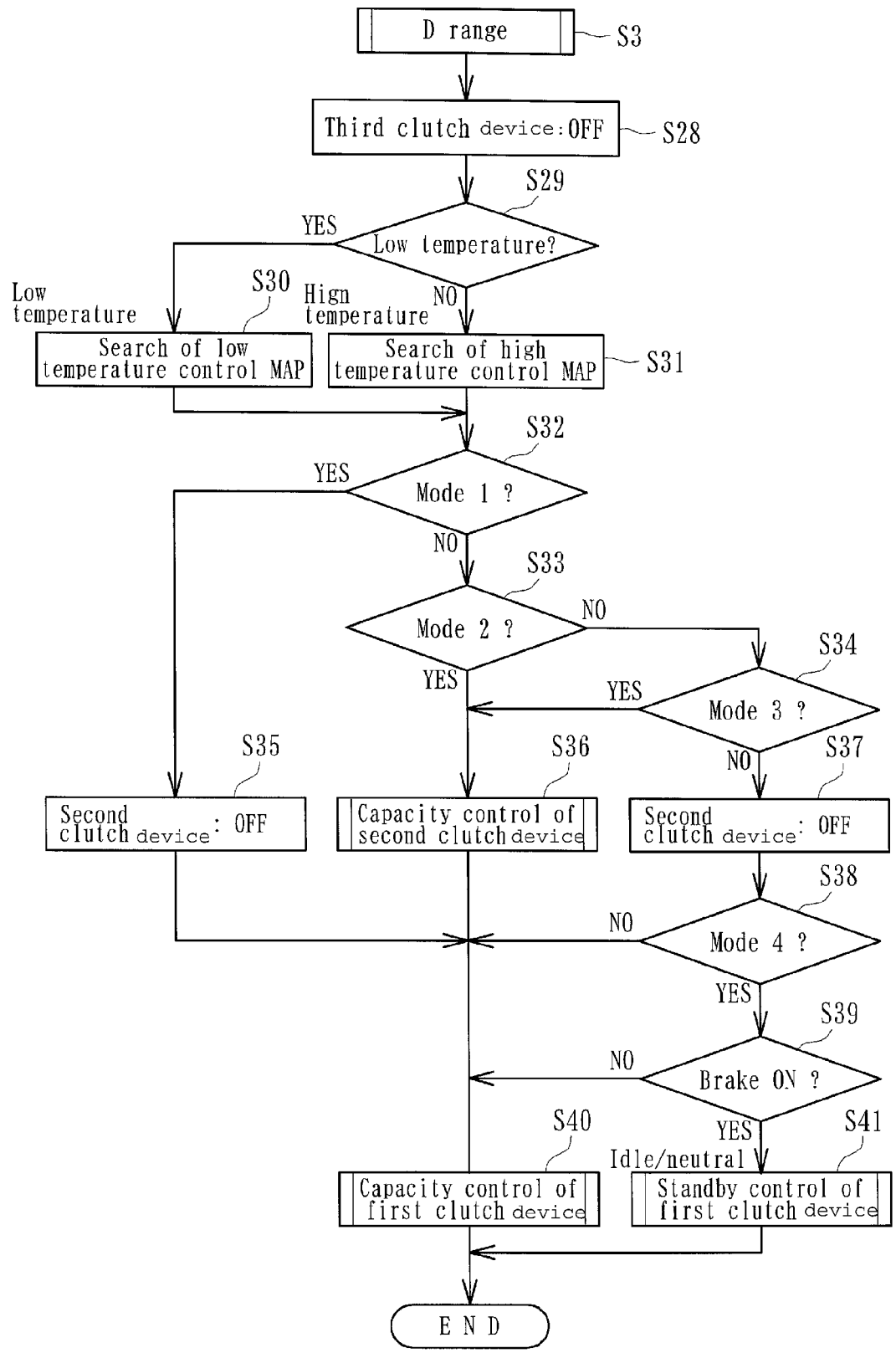

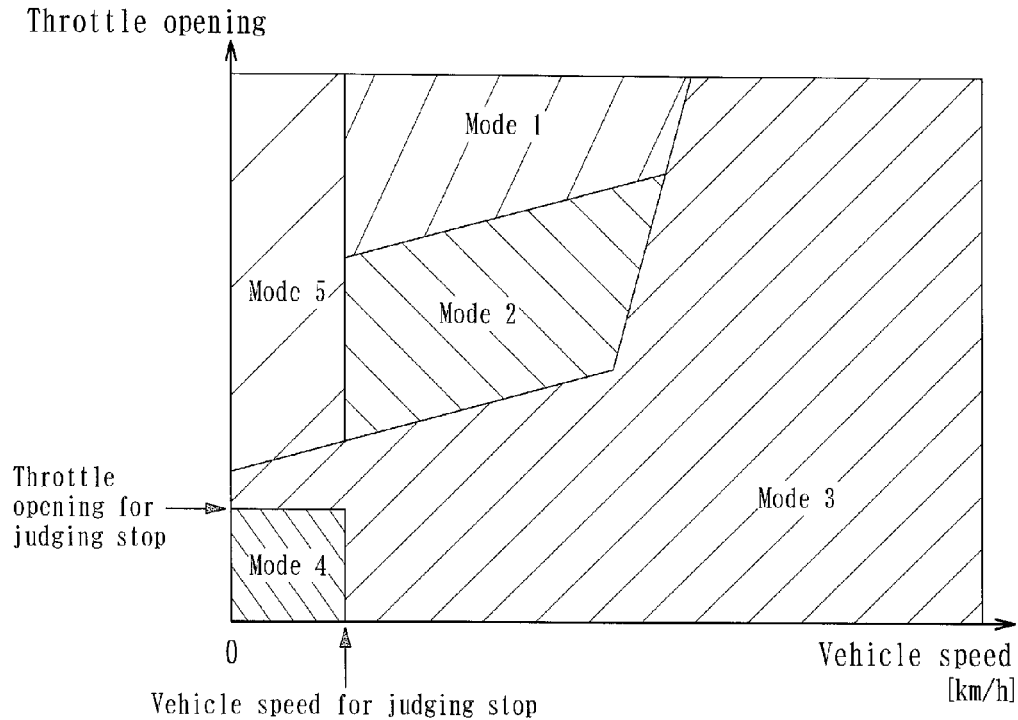
[Fig 18]
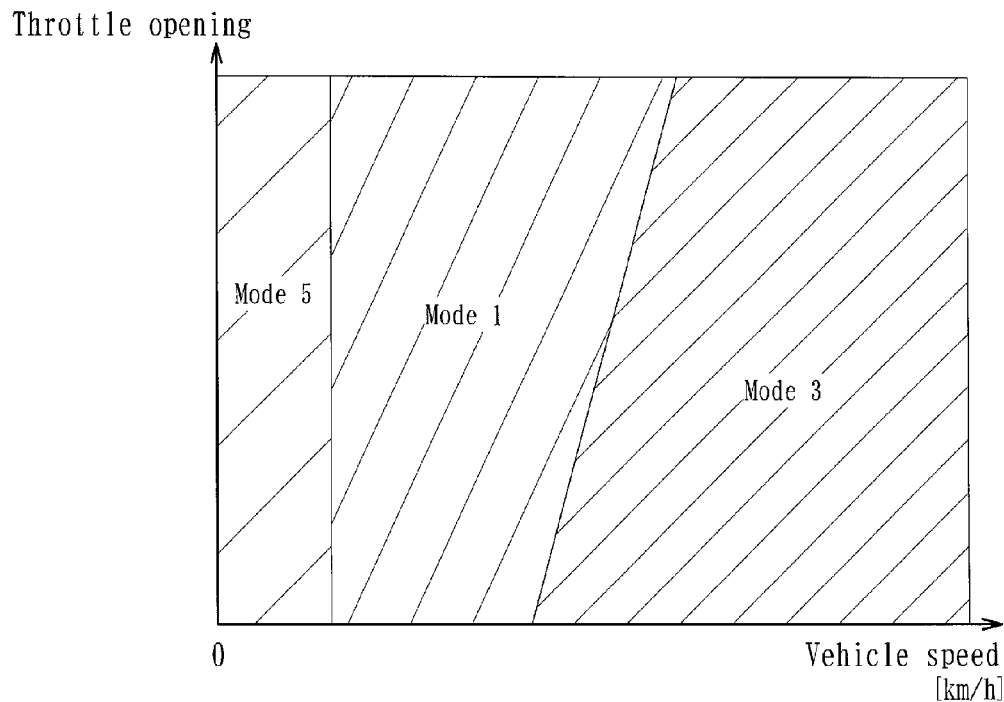
[Fig 19]

[Fig 20]
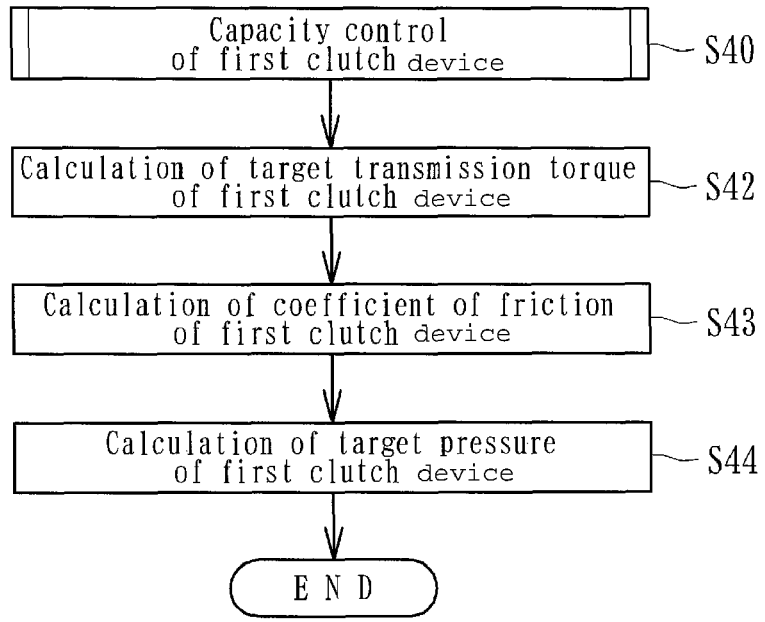
[Fig 21]
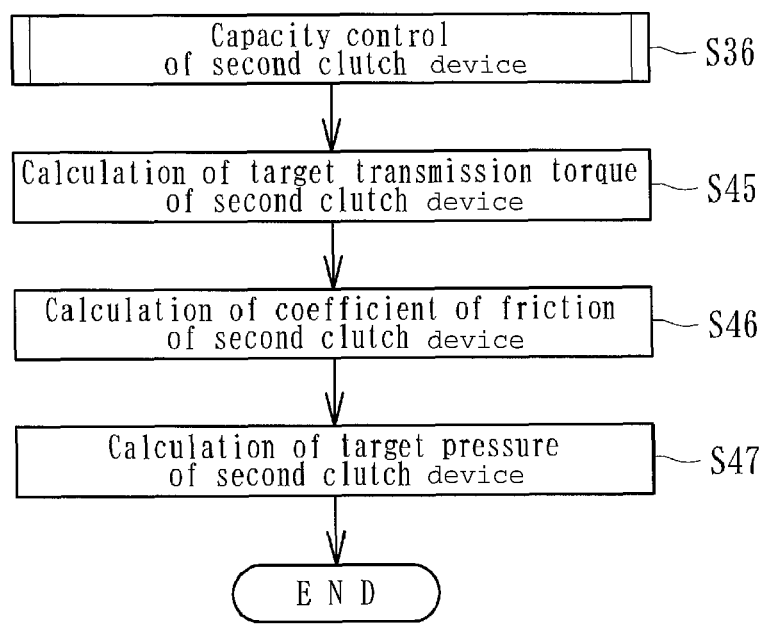

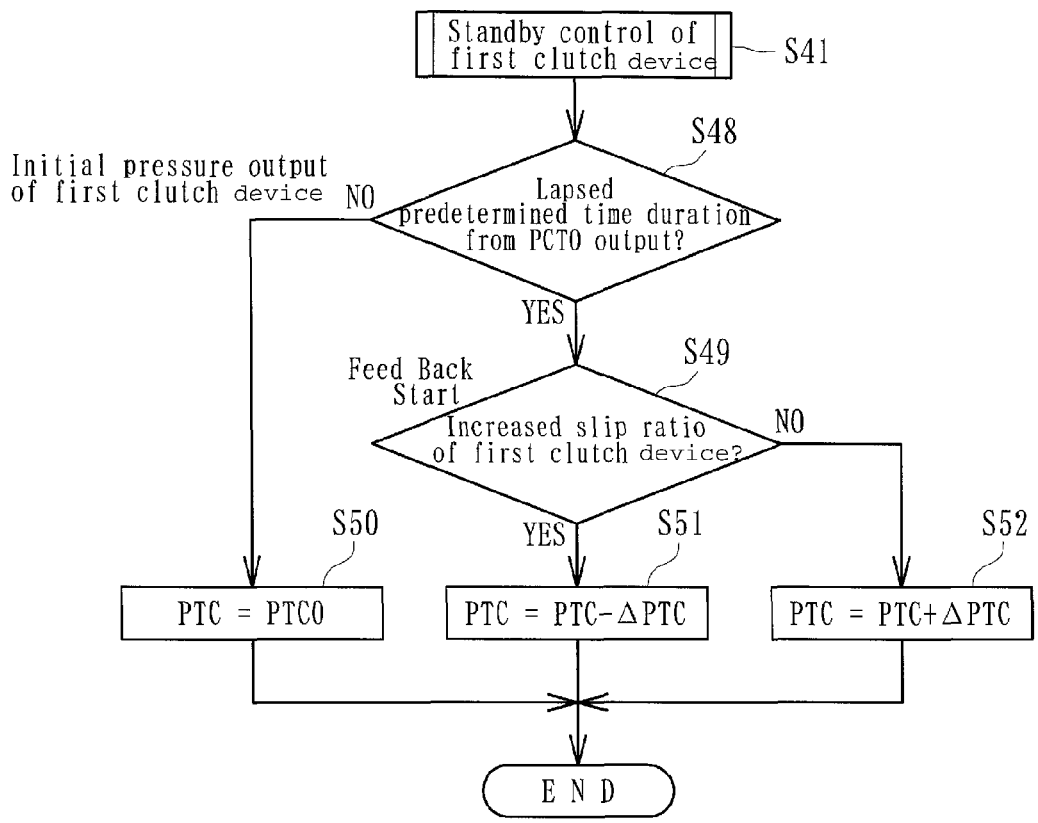
[Fig 22]

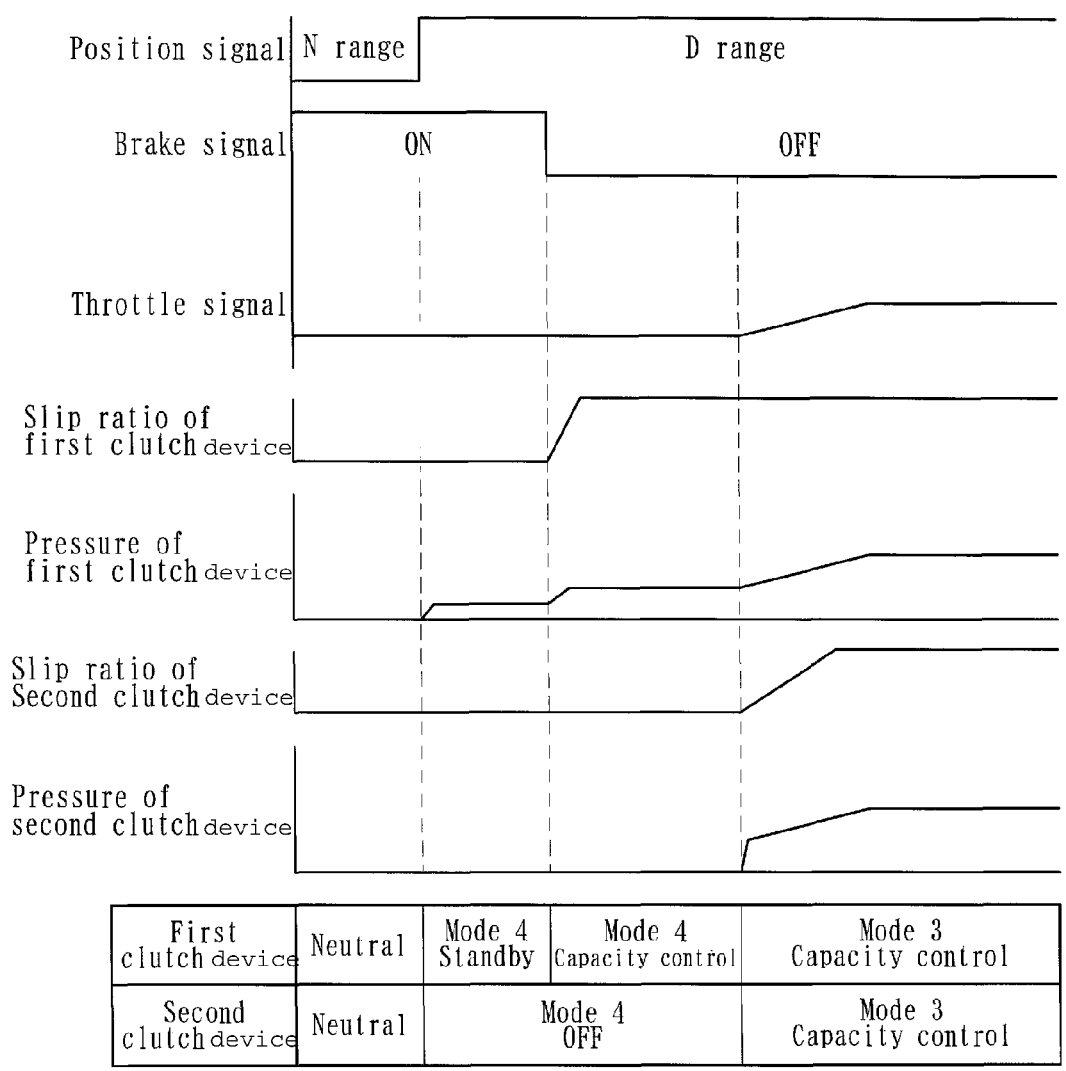
[Fig 23]

[Fig 24]
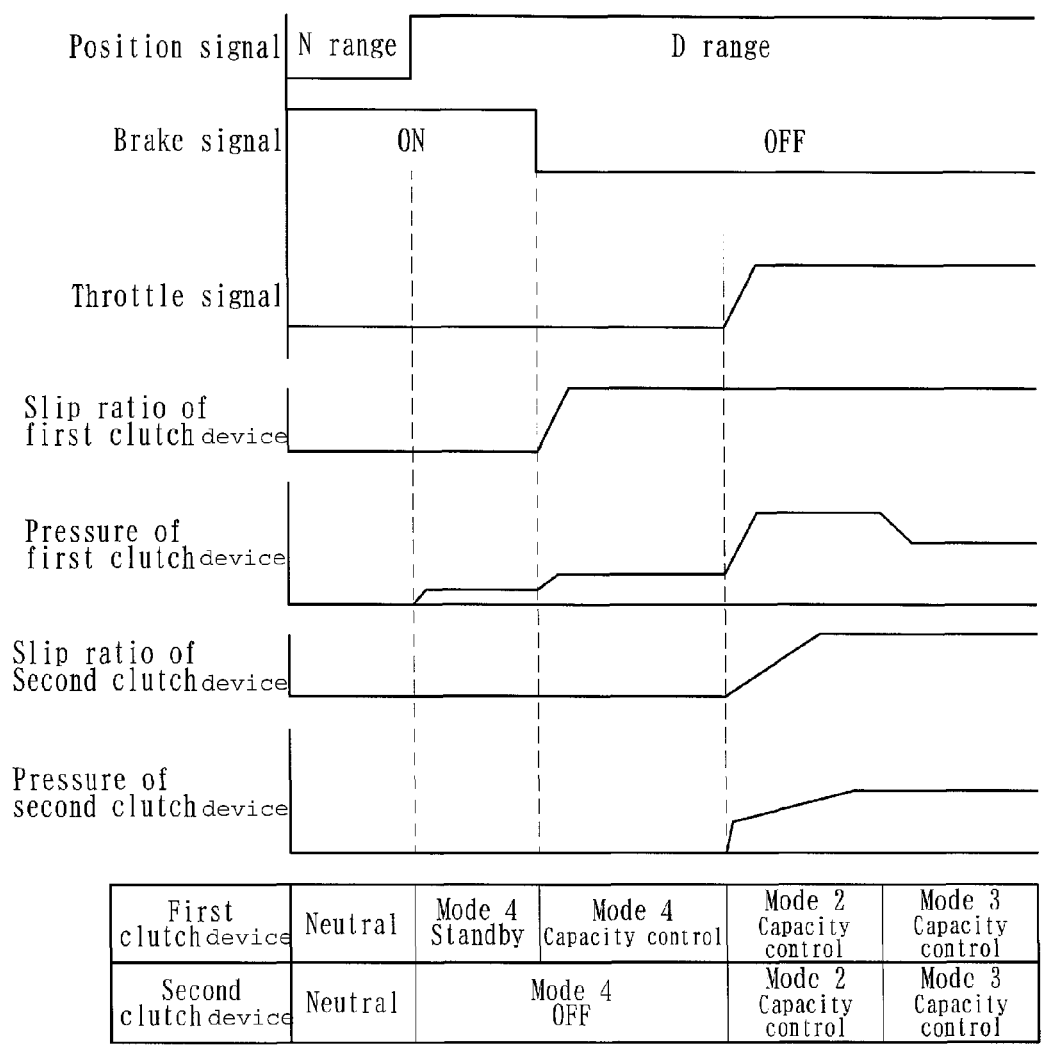

[Fig 25]
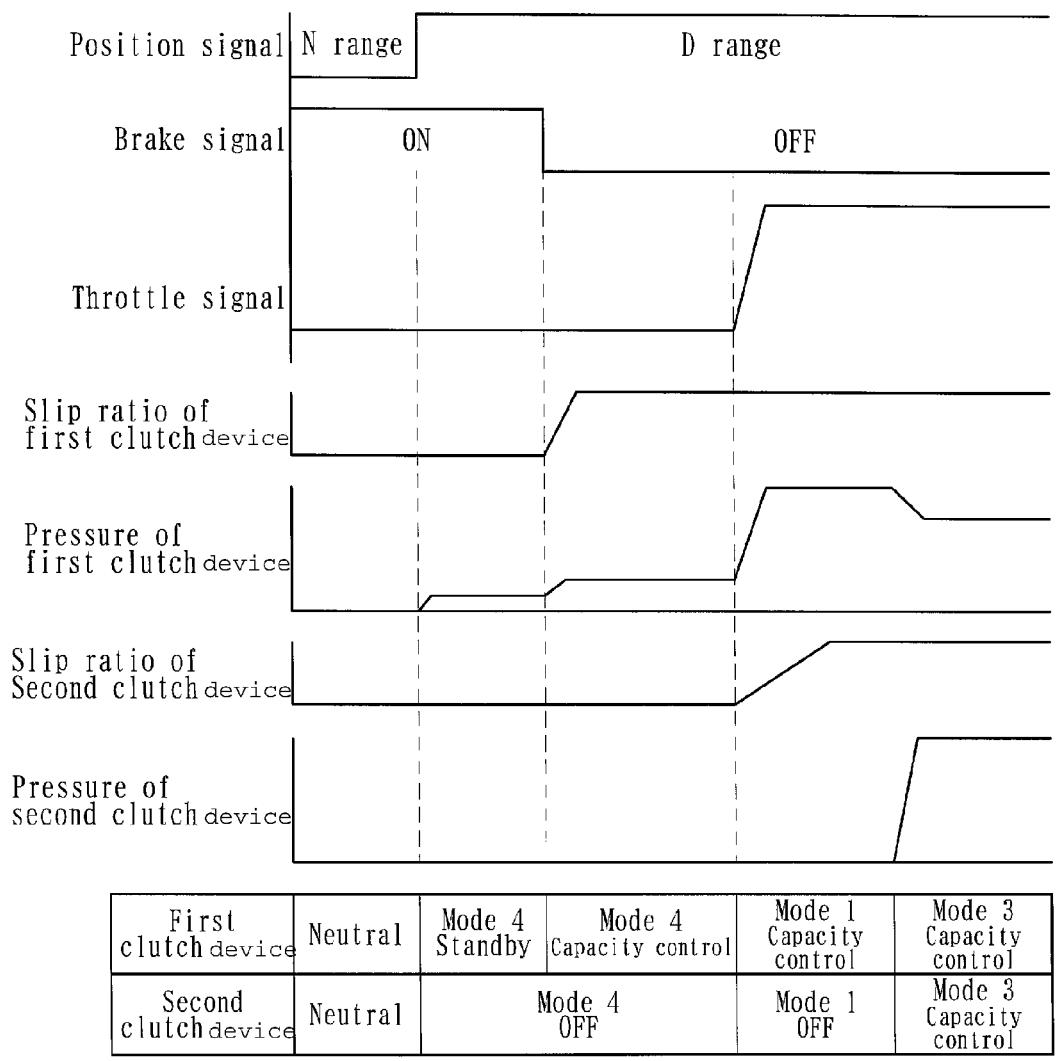

POWER TRANSMITTING APPARATUS

CROSS-REFERENCE TO RELATED APPLICATIONS

This application is a continuation of PCT Application No. PCT/JP2009/005504 filed on Oct. 21, 2009, which claims priority to Japanese Application No. 2008-271644, filed on Oct. 22, 2008, the entire contents of each of which are hereby incorporated by reference.

BACKGROUND OF THE INVENTIONS

1. Field of the Inventions

The present inventions relate to power transmitting apparatuses, such as vehicle transmissions, which transmit power from a driving source of a vehicle to the wheels of the vehicle and which are adapted to properly select transmission of power and cutting-off of power to or from the wheels.

2. Description of the Related Art

Two types of known power transmitting apparatuses for vehicles (e.g., "automatic transmissions") provide starting power (power for initiating movement of the vehicle from a stop) in different ways. One type uses a torque converter ("torque converter type") and another type uses a starting clutch ("starting clutch type") to provide starting power used to start the movement of the vehicle from a stop. In the torque converter type devices, the starting performance benefits from the torque amplifying function of the torque converter. On the other hand, the starting clutch type benefits from increased efficiency because this type of system does not continuously lose power through slippage which occurs in the torque converter types e.g. during a steady running of vehicle.

Japanese Laid-open Patent Publication No. 3193/2005 discloses a power transmitting apparatus which is a torque converter type automatic transmission combined with a lock-up clutch. In this transmission, the lock-up clutch has a clutch piston connected to a turbine of a torque converter and is movable between a connected position in which it abuts against the inner circumferential surface of a torque converter cover and a non-connected separated position. Thus, the torque converter cover and the turbine can be directly connected and disconnected via the clutch piston.

SUMMARY OF THE INVENTIONS

An aspect of at least one of the inventions disclosed herein includes the realization that the benefits of the torque converter type and lock-up clutch type transmissions can be combined in ways in which reduce the complexity and size of the above noted known combined-type apparatuses, while providing the benefits of the torque amplifying function of the torque converter types systems as well as the power transmitting efficiency of the clutch type systems.

More specifically, during steady operation of a vehicle having a torque converter type system, although it has a technical merit of improving the starting performance because of the torque amplifying function of the torque converter when movement is initially started, it can suffer from loss of some power transmitting efficiency because of slippage generated in the torque converter e.g. during steady run of a vehicle.

On the other hand, in the clutch type system, although it has a technical merit of improving the power transmitting efficiency because of not having any slippage which would be found in the torque converter e.g. during steady run of vehicle, it has a technical demerit of decreasing the starting performance since it does not have the torque amplifying function on start of a vehicle obtained by the torque converter. In order to prevent the decrease of the starting performance, the reduction ratio of such transmissions is usually increased.

Further, the known system described in Japanese Laid-open Patent Publication No. 3193/2005, which is a combined torque converter and clutch type, is a relatively large and complicated structure in which the lock-up clutch is movable between the connected position and the non-connected position in the hydraulic atmosphere within the torque converter. This increases both the manufacturing cost and the maintenance cost.

Thus, in accordance with an embodiment, a power transmitting apparatus for selectively transmitting power from a driving source of a vehicle to wheels of the vehicle can comprise a torque converter having a torque amplifying function. A clutch mechanism can comprise a first clutch device configured to transmit a driving force of the driving source to the wheels through the torque converter so as to move the vehicle and a second clutch device configured to transmit the driving force of the driving source to the wheels without the power transmitting system of the torque converter so as to move the vehicle. A selecting device can be configured to selectively operate the first and second clutch devices so as to transmit the driving force of the driving source to the wheels through the power transmitting system of the torque converter and for transmitting the driving force of the driving source to the wheels without the power transmitting system of the torque converter by operating the first clutch device and the second clutch device in accordance a plurality of different modes of operation of the vehicle, at least one of the modes being a starting mode. An input-side measuring device can be configured to measure an input-side rotational speed of the first clutch device. An output-side measuring device can be configured to measure an output-side rotational speed of the first clutch device. A slip ratio calculating device for the first clutch device can be configured to calculate a slip ratio of the first clutch device based on at least one of the difference or the ratio between the rotational speed measured by the input-side measuring device and the rotational speed measured by the output-side measuring device. Additionally, a power transmitting system from a driving source of a vehicle to wheels can comprise the torque converter and a transmission, the clutch mechanism and a variable speed unit being arranged within the transmission.

In some embodiments, a driving source measuring device can be configured to measure the rotational speed of the driving source of a vehicle, and a slip ratio calculating device for the torque converter can be configured to calculate a slip ratio of the torque converter based on a difference or the ratio between the rotational speed measured by the driving source measuring device and the rotational speed measured by the input-side measuring device.

In some embodiments, a hydraulic piston can be configured to move under hydraulic action of a hydraulic oil to change the first clutch between an engaged state and a disengaged state, and wherein the selecting device is configured to control the hydraulic oil of the hydraulic piston based on the slip ratio calculated by the slip ratio calculating device for the first clutch device.

In some embodiments, the selecting device can be configured to maintain the first and second clutch devices in a disengaged state in a neutral condition when the vehicle is stopped by operation of a brake, and wherein the selecting device is also configured to transmit a driving force caused by a creep phenomenon of the torque converter to the wheels by operating the first clutch device with hydraulic oil acting on the hydraulic piston when the braked condition is released.

In some embodiments, the selecting device is configured to perform an ineffective stroke reducing control operation in which the hydraulic piston is moved in an engagement direction until just before the driving force is transmitted to the first clutch device when a vehicle is stopped by operating the brake.

In some embodiments, the selecting device is configured to perform the ineffective stroke reducing control operation based on at least one of the slip ratio calculated by the slip ratio calculating device for the first clutch device and the slip ratio calculating device for the torque converter.

In accordance with an yet another embodiment, a power transmitting apparatus for selectively transmitting power from a driving source of a vehicle to wheels of the vehicle can comprise a torque converter having a torque amplifying function. A clutch mechanism can include a first clutch device configured to transmit a driving force of the driving source to the wheels through the torque converter so as to move the vehicle and a second clutch device configured to transmit the driving force of the driving source to the wheels without the power transmitting system of the torque converter so as to move the vehicle. A selecting device can be configured to selectively operate the first and second clutch devices so as to transmit the driving force of the driving source to the wheels through the power transmitting system of the torque converter and for transmitting the driving force of the driving source to the wheels without the power transmitting system of the torque converter by operating the first clutch device and the second clutch device in accordance a plurality of different modes of operation of the vehicle, at least one of the modes being a starting mode. An input-side measuring device can be configured to measure an input-side rotational speed of the second clutch device. An output-side measuring device configured to measure an output-side rotational speed of the second clutch device. A slip ratio calculating device for the second clutch device configured to calculate a slip ratio of the second clutch device based on at least one of the difference or the ratio between the rotational speed measured by the input-side measuring device for the second clutch device and the rotational speed measured by the output-side measuring device for the second clutch device. Additionally, a power transmitting system from a driving source of a vehicle to wheels can comprise the torque converter and a transmission, the clutch mechanism and a variable speed unit being arranged within the transmission.

In some embodiments, a hydraulic piston configured to move under hydraulic action of a hydraulic oil to change the second clutch device between an engaged state and a disengaged state, wherein the selecting device is configured to control the hydraulic oil of the hydraulic piston based on the slip ratio calculated by the slip ratio calculating device for the second clutch device.

In some embodiments, the operation of the second clutch device is prevented at low temperatures. Additionally, in some embodiments, the operation of the second clutch device is limited at low temperatures.

In embodiments where the slip ratio of the first clutch device is calculated from the difference or the ratio between the rotational speed measured by the input-side measuring device and the rotational speed measured by the output-side measuring device, it is possible to assume the coefficient of friction of the first clutch device based on the slip ratio and thus to easily and more precisely perform the clutch control relative to the first clutch device.

In addition, in embodiments where the selecting device can be used to cause transmission of the driving force to the wheels through the torque converter or without passing through the torque converter, by properly selecting operation of the first clutch device or the second clutch device in accordance with conditions of the vehicle, it is possible to avoid complication and increases in size of the power transmitting apparatus, to improve the starting-up performance by use of the torque amplifying function of the torque converter, and also to improve power transmitting efficiency during the steady run of vehicle.

In embodiments where the slip ratio of the torque converter is calculated based on at least one of the difference or the ratio between the rotational speed measured by the driving source measuring device and the rotational speed measured by the input-side measuring device, it is possible to better estimate the transmitting torque and obtain the advantage of the torque amplifying condition of the torque converter.

In embodiments where control of hydraulic oil is performed based on the slip ratio calculated by the slip ratio calculating device for the first clutch device or the slip ratio calculating device for the torque converter, it is possible to more precisely control of hydraulic oil of the first clutch device.

In embodiments where the first and second clutch devices are not operated and kept in a neutral condition when a vehicle is stopped by operation of a brake, and the driving force caused by the creep phenomenon of the torque converter is transmitted to the wheels by operating the first clutch device by controlling the hydraulic oil acting the hydraulic piston when the braked condition is released, it is possible to improve the operability of the power transmitting apparatus by utilizing the creep phenomenon of the torque converter.

In embodiments where the ineffective stroke reducing control is performed in which the hydraulic piston is operated so that it is shifted until just before the driving force is transmitted to the first clutch device when a vehicle is stopped by operating the brake, it is possible to further improve the responsiveness of the starting-up from the idle/neutral condition.

In embodiments where the ineffective stroke reducing control is performed based on the slip ratio calculated by the slip ratio calculating device for the first clutch device or the slip ratio calculating device for the torque converter, it is possible to more precisely and reliably perform the ineffective stroke reducing control relative to the first clutch device.

In embodiments where the slip ratio of the second clutch device is calculated from the difference or the ratio between the rotational speed measured by the input-side measuring device for the second clutch device and the rotational speed measured by the output-side measuring device for the second clutch device, it is possible to assume the coefficient of friction of the second clutch device based on the slip ratio and thus to easily and more precisely perform the clutch control relative to the second clutch device.

In embodiments including the selecting device for transmitting the driving force of the driving source to the wheels through the power transmitting system of the torque converter or for transmitting the driving force of the driving source to the wheels without through the power transmitting system of the torque converter by properly selecting operation of the first clutch device or the second clutch device in accordance with conditions of the vehicle on its forward run including the starting-up, it is possible to suppress complication and size increase of the power transmitting apparatus, to improve the starting-up performance because of the torque amplifying function of the torque converter, and also to improve power transmitting efficiency during the steady run of vehicle.

In embodiments where the control of hydraulic oil of the second clutch device is performed based on the slip ratio calculated by the slip ratio calculating device for the second clutch device, it is possible to more precisely perform the control of hydraulic oil of the second clutch device.

In embodiments where the operation of the second clutch device is prevented at low temperatures, it is possible to exclusively use the first clutch device rather than the second clutch device, the performance of which can be deteriorated in responsiveness because of low temperatures and thus to suppress the deterioration of responsiveness of the power transmitting apparatus.

In embodiments where the operation of the second clutch device is limited at low temperatures, it is possible to preferentially use the first clutch device rather than the second clutch device the performance of which can be deteriorated in responsiveness because of low temperatures and thus to suppress the deterioration of responsiveness of the power transmitting apparatus.

BRIEF DESCRIPTION OF THE DRAWINGS

FIG. 1 is a longitudinal-section view showing the power transmitting apparatus according to an embodiment;

FIG. 2 is a schematic diagram of the power transmitting apparatus of FIG. 1;

FIG. 3 is an enlarged view showing a clutch of the power transmitting apparatus of FIG. 1;

FIG. 4 is a cross-sectional view taken along a line IV-IV of FIG. 1;

FIG. 5 is a diagram, vehicle speed on the horizontal axis and throttle opening on the vertical axis, illustrating different modes of operation of a selecting device of the power transmitting apparatus of FIG. 1, associated with different ranges of throttle openings and vehicle speeds;

FIG. 6 is an enlarged view of the clutch mechanism of the power transmitting apparatus of FIG. 1 showing a condition in which only the first clutch device is activated;

FIG. 7 is an enlarged view of the clutch mechanism of the power transmitting apparatus of FIG. 1 showing a condition in which only the second clutch device is activated;

FIG. 8 is an enlarged view of the clutch mechanism of the power transmitting apparatus of FIG. 1 showing a condition in which both the first and second clutch device are activated;

FIG. 9 is an enlarged view showing a condition in which the third clutch device is activated;

FIG. 10 is a diagrammatic view showing a power transmitting apparatus of the present invention in which a transmission comprises a continuously variable speed unit;

FIG. 11 is a block diagram showing a CVT ECU and its mutual connection of the power transmitting apparatus;

FIG. 12 is a flow chart illustrating a control routine (which can be considered a main control routine) which can be used to control the power transmitting apparatus;

FIG. 13 is a flow chart illustrating another control routine (which can be considered a sub-flow of an N-range) which can also be used to control the power transmitting apparatus;

FIG. 14 is a flow chart illustrating another control routine (which can be considered a sub-flow of an R-range) of the power transmitting apparatus;

FIG. 15 is a flow chart illustrating another control routine (which can be considered a sub-flow of a D-range; used with a high temperature map) which can also be used to control the power transmitting apparatus;

FIG. 16 is a diagram showing a high temperature map which can be used in the power transmitting apparatus;

FIG. 17 is a flow chart illustrating another control routine (which can be considered a sub-flow of a D-range; used with both a high temperature map and a low temperature map) which can also be used to control the power transmitting apparatus;

FIG. 18 is a diagram showing a high temperature map which can be used in the power transmitting apparatus;

FIG. 19 is a diagram showing a low temperature map which can be used in the power transmitting apparatus;

FIG. 20 is a flow chart illustrating another control routine (capacity control of hydraulic oil of a first clutch) which can also be used to control the power transmitting apparatus;

FIG. 21 is a flow chart illustrating another control routine (capacity control of hydraulic oil of a second clutch) which can also be used to control the power transmitting apparatus;

FIG. 22 is a flow chart illustrating another control routine (standby control of a first clutch) which can also be used to control the power transmitting apparatus;

FIG. 23 is a time chart showing one control of the power transmitting apparatus;

FIG. 24 is a time chart showing another control of the power transmitting apparatus; and FIG. 25 is a time chart showing the other control of the power transmitting apparatus.

DETAILED DESCRIPTION OF THE PREFERRED EMBODIMENT

An embodiment of a power transmitting apparatus can be configured to transmit or cut-off the driving force from an engine (driving source) of an automobile (vehicle) to or from the wheels (driving wheels). Such an apparatus can include, with reference to FIGS. 1 and 2, a torque converter 1, a clutch mechanism 3, a selecting device 4, a first driving shaft 5, a second driving shaft 6, a damper mechanism 7, a third clutch device 8, a slip ratio calculating device 25 for a first clutch device, a slip ratio calculating device 26 for the torque converter, and a slip ratio calculating device 27 for a second clutch device.

An embodiment of a power transmitting can further comprise a speed sensor Y1 which can serve as an "input-side measuring means", a speed sensor Y2 which can serve as an "output-side measuring means", a speed sensor Y3 which can serve as an "input-side measuring means for the second clutch device", and a speed sensor Y4 configured to detect a speed of a vehicle. The above noted sensors as examples of the types of device that can be used to serve as the input-side measuring means, output-side measuring means, input-side measuring means for the second clutch device; other devices can also be used.

FIG. 1 is a longitudinal-section view showing a main part of the embodiment of the power transmitting apparatus. FIG. 2 is a schematic diagram of the power transmitting apparatus of FIG. 1.

As shown in FIG. 2, the torque converter 1 and a transmission 2 are configured to perform as a power transmitting system that transmits power from the engine E (as the driving source) of a vehicle to wheels of the vehicle (driving wheels D). The transmission 2 can include a variable speed unit A, in addition to or instead of the clutch mechanism 3, and the third clutch device 8. In FIG. 1 a reference numeral 11 denotes an input shaft extending from the engine E and a reference numeral 9 denotes an output shaft extending to the variable speed unit A.

The torque converter 1 can provide a torque amplifying function for amplifying the torque from the engine E and transmitting it to the transmission 2. The torque converter 1 is rotated around its shaft by the driving force transmitted from the engine E. The torque amplifying function of hydraulic torque converters is well known in the art and is associated with the slippage occurring in such torque converters when at or near the stall phase of operation and thus is not further described herein.

The torque converter 1 can comprise torque converter covers 1a and 13 for containing a liquid (operating oil) in a fluid-tight manner. A pump P can be formed on the side of torque converter cover 1a and can thus rotate together with the torque converter cover 1a. A turbine T can be arranged oppositely to the pump P and rotatable at a side of the torque converter cover 13.

The input shaft 11 can be connected to the torque converter cover 13 through a cover member 12. When the input shaft 11 is rotated by the driving force of the engine E, the cover member 12, the torque converter covers 13 and 1a, and the pump P are rotated. The rotational torque is thus transmitted to the turbine T through the liquid (operating oil) with the torque being amplified. The turbine T is then rotated by the amplified torque and thus the amplified torque is transmitted to the transmission 2 through a first driving shaft 5 spline-fitted with the turbine T. The term "power transmitting system of the torque converter" used herein means a power transmitting system formed by the torque converter cover 1a, the pump P and turbine T. Reference numeral 10 in FIG. 1 denotes a transmission case.

On the other hand, the torque converter cover 13 is connected to a connecting member 14 through the damper mechanism 7 comprising coil springs and the connecting member 14 is further spline-fitted with the outer circumferential surface of a second driving shaft 6. Accordingly, when the input shaft 11 is rotated by the driving force of the engine E, the cover member 12, the torque converter cover 13, the connecting member 14 and the second driving shaft 6 are rotated, and thus the driving torque of the engine E is transmitted to the transmission 2. That is, the second driving shaft 6 can transmit the driving force to the transmission 2 without the power transmitting system of the torque converter 1.

As described above, the first driving shaft 5 can be rotated by the driving force of the engine E through the power transmitting system of the torque converter 1 and is connected to the first clutch device 3a, and the second driving shaft 6 can be directly rotated by the driving force of the engine E without the power transmitting system of the converter 1 and is connected to the second clutch device 3b. In addition, the first driving shaft 5 can be a hollow cylindrical member and the second driving shaft 6 can be rotatably, coaxially arranged within the first driving shaft 5. Thus, the first driving shaft 5 can be rotatable around the second driving shaft 6 and, on the other hand, the second driving shaft 6 is rotatable within the first driving shaft 5. The first driving shaft 5 and the second driving shaft 6 can be independently rotated by properly selected operation of the clutch device 3.

The clutch mechanism 3 can comprises the first clutch device 3a operable on advancement of an automobile (vehicle) and adapted to transmit the driving force of the engine (driving source) E to the wheels (driving wheels D) through a power transmitting system of the torque converter 1. A second clutch device 3b can be adapted to transmit the driving force of the engine E to the wheels D without the power transmitting system of the torque converter 1. The first and second clutch devices 3a and 3b respectively can comprise a plurality of driving side clutch discs 3aa and 3ba, and a plurality of driven side clutch discs 3ab and 3bb slidable to right and left directions in drawings, and thus each form multiple disc clutches.

In the first clutch device 3a, the driving side clutch discs 3aa can be mounted on an interlocking member 15 connected to the first driving shaft 5 and interlocking therewith and the driven side clutch discs 3ab are mounted on a box member 17, and the driving side clutch discs 3aa and the driven side clutch discs 3ab are alternately arranged each other to form a laminated structure. These driving side clutch discs 3aa and the driven side clutch discs 3ab can be press-contacted or separated with each other. FIG. 6 shows a condition in which the first clutch device 3a is actuated and the driving side clutch discs 3aa and the driven side clutch discs 3ab are press-contacted.

Meanwhile, in the second clutch device 3b, the driving side clutch discs 3ba are mounted on an interlocking member 16 connected to the second driving shaft 6 and interlocking therewith and the driven side clutch discs 3bb are mounted on the box member 17, and the driving side clutch discs 3ba and the driven side clutch discs 3bb are alternately arranged each other to form a laminated structure. These driving side clutch discs 3ba and the driven side clutch discs 3bb can be press-contacted or separated with each other. FIG. 7 shows a condition in which the second clutch device 3b is actuated and the driving side clutch discs 3ba and the driven side clutch discs 3bb are press-contacted each other.

The term "separated" used herein means a condition in which a pressure applied to the clutch discs is released while the clutch discs may remain in contact with each other, for example, while slipping. Thus, the term "separated" is not limited only to a physically separated condition. The transmission of driving force is allowed under the press-contacted condition and cut off under the separated condition.

As shown in FIG. 3, the clutch mechanism 3 can comprise the first clutch device 3a, the second clutch device 3b and two hydraulic pistons P1 and P2 corresponding respectively to the first and second clutch devices 3a and 3b contained in a same box member 17. The first and second clutch device 3a and 3b can thus be selectively actuated by controlling the hydraulic pressure for actuating the hydraulic pistons P1 and P2.

For example, the hydraulic piston P1 can be moved toward the right in FIG. 3 against an urging force of a return spring 3c by supplying the operating oil into a hydraulic chamber S1 between the box member 17 and the hydraulic piston P1, and thus the first clutch device 3a is pressed by tips formed on the hydraulic piston P1 to press-contact the driving side clutch discs 3aa and the driven side clutch discs 3ab against each other. The tips formed on the hydraulic piston P1 can be passed through recesses formed on the peripheries of the driving side clutch discs 3ba and the driven side clutch discs 3bb of the second clutch means 2b as shown in FIG. 4.

The hydraulic piston P2 can be moved toward the right in FIG. 3 against an urging force of a return spring 3c by supplying the operating oil into a hydraulic chamber S2 between the hydraulic piston P1 and the hydraulic piston P2, and thus the second clutch device 3b is pressed by tips formed on the hydraulic piston P2 to press-contact the driving side clutch discs 3ba and the driven side clutch discs 3bb against each other. Thus the first clutch device 3a and the second clutch device 3b can be selectively actuated, independently, by controlling the hydraulic pressures operating the hydraulic pistons P1 and P2. In other words, the pistons P1 and P2 can change the first and second clutch devices between engaged and disengaged states.

The box member 17 forming part of the clutch mechanism 3 can be connected to an interlocking member 18 formed thereon a gear G1 mating with a gear G2 formed on the output shaft 9. Thus, the driving force of the engine E transmitted through the first and second clutch devices 3a and 3b can be transmitted to the output shaft 9 through the box member 17 and the interlocking member 18.

The selecting device 4 can be configured to selectively actuate the first clutch device 3a or the second clutch device 3b by properly selecting the operation of the hydraulic pistons P1 or P2 with supplying operating oil at a predetermined pressure into the hydraulic chamber S1 or S2 according to conditions (e.g. running speed of a vehicle, inclined angle of a vehicle body etc.) of a vehicle on its advance (including "starting" which means to initiate movement of the vehicle from a stop) in order to transmit the driving force of the engine E to the driving wheels D through or without the power transmitting system of the torque converter 1. The selecting device 4 can be formed in an ECU (not shown) for controlling the engine E and programmed so as to actuate the clutch mechanism 3 based e.g. on conditions, such as those shown in a diagram (indicating a throttle opening on ordinate and a vehicle speed on abscissa) of FIG. 5. However, other conditions can also be used. In some embodiments, the selecting device 4 can be in the form of one or more hard-wired circuits, dedicated processors and memory, and/or a general purpose processor and memory running one or a plurality of control programs for performing the functions described herein. In embodiments where the selecting device 4 includes one or more processors, the control methods described herein, including those described below with reference to the flow charts and map of FIGS. 12-22, can be in the form of computer implemented instructions, computer programs, modules, etc., stored in a memory device and executed by the one or more processors, some embodiments of which, can achieve the performance described below with regard to the timing diagrams of FIGS. 23-25. In addition, various components, functions and aspects of the selecting device 4 and its components may be grouped and/or separated into sub-devices, sub modules, or separate devices.

According to the diagram of FIG. 5, following modes (a)-(f) are properly selected and thus the first clutch device 3a or second clutch device 3b can be properly selected and actuated in accordance with any one of these modes (a)-(f). The modes (a)-(f) can be described as follows: (a) an idle neutral mode (a mode of neutral condition in which both the first and second clutch means 3a and 3b are not actuated when a vehicle is in a stopped condition by a braking operation); (b) a creep mode (a mode utilizing a creep phenomenon of the torque converter 1 by operating the first clutch device 3a); (c) a stall mode (a mode in which the first clutch device 3a is actuated on start of a vehicle); (d) a direct starting mode (a mode in which the second clutch device 3b is actuated on start of a vehicle); (e) a torque divided starting mode; and (f) a torque converter starting mode (a mode in which the first clutch device 3a is actuated).

The torque divided starting mode (e) can be a mode in which the driving force transmitted through the power transmitted system of the torque converter 1 and the driving force transmitted without through the power transmitted system of the torque converter 1 are transmitted to the driving wheels D at a predetermined ratio by operating both the first and second clutch devices 3a and 3b. The ratio of driving forces to be transmitted may be arbitrarily set, or in other words, can be set to any desired ratio. FIG. 8 shows a condition in which both the first and second clutch devices 3a and 3b are actuated and the driving side and driven side clutch discs 3aa and 3ab as well as the driving side and driven side clutch discs 3ba and 3bb are in press-contacted conditions.

As described above, since the first or second clutch devices 3a or 3b can be selectively actuated in accordance with modes shown in the diagram of FIG. 5 enabling comparison with conditions of a vehicle, it is possible to transmit the driving force of the engine E to the driving wheels D without the power transmitting system of the torque converter 1 under conditions of level ground start, level ground run and downhill run and also possible to transmit the driving force of the engine E to the driving wheels D through the power transmitting system of the torque converter 1 under conditions of uphill start, uphill run and running during traffic congestion.

On the other hand, the third clutch device 8 can comprise a multiple disc clutch and can be configured to transmit the driving force of the engine E to the driving wheels D through the power transmitting system of the torque converter 1 during reverse direction operation. That is, the driving force of the engine E can be transmitted to the third clutch device 8 with a gear G3 formed on the interlocking member 15 engaged with a gear G4 formed on a interlocking member 19 of a side of the output shaft 9 through an idle gear (not shown) arranged therebetween by operating a shift lever (not shown) to the R Range (reverse position).

Similar to the first clutch device 3a and the second clutch device 3b, the third clutch device 8, as shown in FIG. 9, comprises a box member 20 connected to the output shaft 9 and interlocking therewith. The box member 20 contains therein a hydraulic piston P3 and driving side clutch discs 8a and the driven side clutch discs 8b alternately arranged each other to form a lamination. Thus, the driving side and driven side clutch discs 8a and 8b can be press-contacted or separated by actuating the hydraulic piston P3. FIG. 9 shows a condition in which the driving side and driven side clutch discs 8a and 8b are press-contacted each other by actuation of the hydraulic piston P3.

In some embodiments, the power transmitting apparatus is configured so that the selecting device 4 can actuate only the third clutch device 8 when the vehicle is shifted into reverse gear. That is, when the shift lever is positioned in the reverse (R) range, the apparatus is switched to the R mode (g) as shown in Table of FIG. 5, and thus the driving force of the engine E can be transmitted to the driving wheels D through the power transmitting system of the torque converter 1.

The power transmitting apparatus can include a speed sensor Y1, which can serve as a an input-side measuring means, can comprise a sensor measuring a rotational speed at the input-side of the first clutch device 3a. For example, the speed sensor Y1 can be configured to detect a rotational speed of the first driving shaft 5 and output a signal indicative of that rotational speed. A speed sensor Y2, which can serve as an output-side measuring means, can comprise a sensor measuring a rotational speed at the output-side of the first clutch device 3a. For example, the sensor Y2 can be configured to detect the rotational speed of the output shaft 9 and output a signal indicative of that rotational speed. Furthermore a speed sensor Y3, which can serve as a driving source measuring means, can comprises a sensor configured to measure a rotational speed at the driving source (engine E) and a speed sensor Y4 which can comprise a sensor configured to detect a rotational speed between the variable speed unit A and the wheels (driving wheels D).

These speed sensors Y1-Y4 can be electrically connected respectively to a slip ratio calculating device 25 for the first clutch device 3a and a slip ratio calculating device 26 for the torque converter 1. Accordingly the slip ratio calculating device 25 for the first clutch device can be configured to calculate a slip ratio of the first clutch device 3a based on the difference or the ratio between the rotational speed measured by the speed sensor Y1 and the rotational speed measured by the speed sensor Y2. Similarly the slip ratio calculating device 26 for the torque converter can be configured to calculate the slip ratio of the torque converter 1 from the difference or the ratio between the rotational speed measured by the speed sensor Y3 and the rotational speed measured by the speed sensor Y1.

As shown in FIG. 11 the slip ratio calculating device 25 for the first clutch device and the slip ratio calculating device 26 for the torque converter can be contained within a CVT ECU mounted on a vehicle together with the selecting device 4 and other devices such as a slip ratio calculating device 27 for the second clutch device, a compensating means 21, a control means 28 described later, and/or other devices. The CVT ECU can be electrically connected to the speed sensors Y1-Y4 and other devices mounted on a vehicle such as a brake switch, a throttle opening sensor, a position sensor, an intake pressure sensor, an atmospheric pressure sensor, an engine coolant temperature sensor, TM (transmission) temperature sensor etc. and adapted to receive detected signals from these sensors. The control device 28 in the CVT ECU can be electrically connected to a hydraulic pressure control circuit 23 and adapted to appropriately control hydraulic pressures for operating the hydraulic pistons P1-P3 or a pulley pressure of the transmission (e.g. an continuously variable speed unit) via the hydraulic pressure control circuit 23.

In some embodiments, the first clutch device 3a is operable by controlling, adjusting manipulating a pressure or other characteristic of hydraulic oil acting on the hydraulic piston P1 (hereinafter simply referred to "capacity control") corresponding to the first clutch device 3a. Such capacity control can be performed based on the slip ratio calculated by the slip ratio calculating device 25 for the first clutch device 3a and/or the slip ratio calculating device 26 for the torque converter 1.

In addition, the first and second clutch device 3a, 3b are not actuated and are maintained in the neutral condition when a vehicle is in the stopped condition, such as when the brake of a vehicle is operated (i.e., when the vehicle is stopped with its brakes while a shifting selector of the transmission is in the "D" range). The transmission 2 is controlled so that the driving force generated by the creep phenomenon of the torque converter 1 is transmitted to the wheels (driving wheels D) by operating the first clutch device 3a with performing the capacity control when the operation of the brake is released.

Further, in some embodiments, an "ineffective stroke reducing control" can be performed in which the hydraulic piston P1 is operated so that it is shifted until just before the driving force is transmitted to the first clutch device 3a when a vehicle is stopped by operating the brake. For example, the hydraulic oil working against the piston P1 can be controlled, by the selecting device 4, such that the piston P1 moves in a direction of engagement of the first clutch device 3a so as to reduced or eliminate any gap between the driving side clutch discs 3aa and the driven side clutch discs 3ab. As such, when the first clutch device 3a is subsequently changed into the engaged state, the engagement and the beginning of the transmission of power is more smooth. In some embodiments, the ineffective stroke reducing control is performed based on the slip ratio calculated by the slip ratio calculating device 25 for the first clutch device 3a and/or the slip ratio calculating device 26 for the torque converter 1.

When the capacity control of the first clutch device 3a is performed based on the slip ratio calculated by the slip ratio calculating device 25 for the first clutch device 3a and/or the slip ratio calculating device 26 for the torque converter 1 as described above, it is possible to more precisely perform the capacity control of the first clutch device 3a. In addition since the first and second clutch device 3a, 3b are not operated and maintained in the neutral condition when a vehicle is stopped by operation of a brake, and the driving force caused by the creep phenomenon of the torque converter 1 is transmitted to the driving wheels by operating the first clutch device 3a by performing the capacity control of the first clutch device 3a when the braked condition is released, it is possible to improve the operability of the power transmitting apparatus by transmitting the driving force caused by the creep phenomenon of the torque converter 1.

In addition since the ineffective stroke reducing control is performed in which the hydraulic piston P1 is operated so that it is shifted until just before the driving force is transmitted to the first clutch device 3a when a vehicle is stopped by operating the brake, it is possible to further improve the responsiveness of the starting-up from the idle/neutral condition. Furthermore since the ineffective stroke reducing control is performed based on the slip ratio calculated by the slip ratio calculating device 25 for the first clutch device 3a or the slip ratio calculating device 26 for the torque converter 1, it is possible to more precisely perform the ineffective stroke reducing control relative to the first clutch device 3a.

In some embodiments, the power transmitting apparatus comprises an input-side measuring device for the second clutch device 3b which is configured to measure an input-side rotational speed of the second clutch device 3b and an output-side measuring device for the second clutch device 3b configured to measure an output-side rotational speed of the second clutch device 3b. As such, the speed sensors Y3, Y2 can be considered as functioning respectively as the input-side and the output-side measuring means for the second clutch device 3b.

That is, it is structured so that the speed sensor Y3 functions not only as the driving source measuring means but as the input side measuring means for the second clutch device 3b and the speed sensor Y2 functions not only as the output side measuring means but as the output side measuring means for the second clutch device 3b. Accordingly, it is possible to calculate the slip ratio of the second clutch device 3b with the slip ratio calculating device 27 from the difference or the ratio between the rotational speed measured by the input-side measuring means Y3 for the second clutch device 3b and the rotational speed measured by the output-side measuring means Y2 for the second clutch device 3b.

According to this structure since the slip ratio of the second clutch device 3b is calculated from the difference or the ratio between the rotational speed measured by the input-side measuring device Y3 for the second clutch device 3b and the rotational speed measured by the output-side measuring device Y2 for the second clutch device 3b, it is possible to assume the coefficient of friction (both the dynamic μ and static μ) of the second clutch device 3b based on the slip ratio and thus to easily and more precisely perform the clutch control of the second clutch device 3b.

In some embodiments, the power transmitting apparatus further comprises a hydraulic piston P2 corresponding to the second clutch device 3b and the second clutch device 3b is operable with controlling the hydraulic oil acting on the hydraulic piston P2. As such, the capacity control of the second clutch device 3b can be performed based on the slip ratio calculated by the slip ratio calculating device 27 for the second clutch device 3b. With such a structure, since the capacity control of hydraulic oil of the second clutch device 3b is performed based on the slip ratio calculated by the slip ratio calculating device for the second clutch device 3b, it is possible to more precisely perform the capacity control of hydraulic oil of the second clutch device 3b.

The power transmitting apparatus can be configured so that the operation of the second clutch device 3*b* is prevented or limited at low temperatures (i.e. when a temperature detected by the TM temperature sensor is low). That is, since the viscosity of the hydraulic oil (operating oil) for operating the hydraulic pistons P1, P2 is different and thus changes reduces responsiveness of the transmission at low temperatures, the operation of the second clutch device 3*b* is prevented or limited when it is determined that the temperature is low. Although it is possible that the responsiveness of the first clutch device 3*a* would also be deteriorated at low temperatures, since the degree of deterioration of the first clutch device 3*a* is small as compared with the second clutch device 3*b*, it is possible to suppress the degree of deterioration of the first clutch device 3*a* to smaller than that of the second clutch device 3*b*.

Accordingly, in some embodiments, only the first clutch device is used, rather than the second clutch device which would be much deteriorated in the responsiveness because of low temperatures, and thereby the deterioration of responsiveness of the power transmitting apparatus is reduced or avoided. Since the operation of the second clutch device is limited at low temperatures, it is possible to preferentially use the first clutch device rather than the second clutch device which would be much deteriorated in the responsiveness because of low temperatures, and thereby deterioration of responsiveness of the power transmitting apparatus can be suppressed.

Embodiments of control techniques of the power transmitting apparatus are described below with reference to flow charts of FIGS. 12-15.

A control method, which can be referred to as a "main control" of the apparatus, is described with reference to the flow chart of FIG. 12. This control can be used to determine if the power transmitting apparatus is to be operated in a "drive", "reverse", or "neutral" modes. In the flow chart of FIG. 12, firstly, it is determined whether the speed change selector apparatus is in D range (Drive range) (S1). If it is in D range, the control method goes to a sub-flow of D range (S3). If it is determined that the speed change selector is not in D range, it is determined whether it is in R range (Reverse range) (S2). If in R range, the control method goes to a sub-flow of R range (S4), and on the contrary if not in R range it is determined as N range (Neutral range) and goes to a sub-flow of N range (S5).

In the sub-flow N range of the control method as shown in FIG. 13, the first clutch device 3*a* is cut off (S6), the second clutch device 3*b* is cut off (S7), and then the third clutch device 8 is cut off (S8) (as used herein, "cut off" means that the clutches are controlled to be in a "separated" state).

In the sub-flow of R range of the control method as shown in FIG. 14, the first clutch device 3*a* is cut off (S9) and the second clutch device 3*b* is cut off (S10). Successively it is determined whether the third clutch device 8 is cut off (S11). If the third clutch device 8 is cut off, the control method goes to S12 and is determined whether the vehicle speed is larger than a predetermined value. If the vehicle speed is larger than the predetermined value, the control method goes to S13 and the third clutch device 8 is cut off by control of an inhibitor. If it is determined in S11 that the third clutch device is not cut off and in S12 that the vehicle speed is not larger than the predetermined value, it goes to S14 and the third clutch device 8 is capacity controlled.

As shown in FIG. 15, in the sub-flow (S3) of D range (operation of the second clutch device 3*b* is prevented at low temperatures), the third clutch device 8 is cut off (S15) and then the control method goes to S16 to decide whether it is at low temperatures (i.e. whether the temperature detected by the TM temperature sensor is low temperature). If determined it is not at low temperatures, the control method goes to S17 and searches a high temperature map such as shown in FIG. 16 to decide whether it should be mode 1 from a relation between the vehicle speed and the throttle opening with reference to the high temperature map (S18).

If it is determined that the control method should not be mode 1 it is determined whether it should be mode 2 from the relation between the vehicle speed and the throttle opening with reference to the high temperature map (S19). If it should not be mode 2 it is determined whether it should be mode 3 from the relation between the vehicle speed and the throttle opening with reference to the high temperature map (S20). If it is determined in S16 that it is low temperature and in S18 that it should be mode 1, it goes to S22 to cut off the second clutch device 3*b* and then to S26 to capacity control the first clutch device 3*a*.

If it is determined in S19 that it should be mode 2 and in S21 that it should be mode 3, it goes to S20 to capacity control the second clutch device 3*b* and then to S26 to capacity control the first clutch device 3*a*. In addition if it is determined in S21 that it should not be mode 3 it goes to S23 to cut off the second clutch device 3*b* and then it is determined whether it should be mode 4 from the relation between the vehicle speed and the throttle opening with reference to the high temperature map (S24).

If it is determined in S24 that it should be mode 4, it is then determined if the vehicle is under a braking condition (S25). If the vehicle is braked, the control method goes to S27 and performs standby control of the first clutch device 3*a* (i.e. performs the "ineffective stroke reducing control" described above). On the other hand, if it is determined in S24 that the control method should not be in mode 4 and in S25 that the vehicle is not braked, the control method goes to S26 to perform the capacity control of the first clutch device 3*a*.

As shown in FIG. 17, in the sub-flow (S3) of D range (operation of the second clutch device 3*b* is limited at low temperatures), the third clutch device 8 is cut off (S28) and then the control method goes to S29 to determine whether it is at low temperatures (i.e. whether the temperature detected by the TM temperature sensor is low temperature). If determined that it is not at low temperatures, the control method goes to S31 and searches a high temperature map such as shown in FIG. 18. On the other hand, if it is determined that it is at low temperatures, it goes to S30 and searches a low temperature map such as shown in FIG. 19. Then a mode is determined from a relation between the vehicle speed and the throttle opening with reference to the high temperature map or the low temperature map.

Thus it is determined whether the control method should be mode 1 from the relation between the vehicle speed and the throttle opening with reference to the high temperature map or the low temperature map (S32). If it should not be mode 1 it is determined whether it should be mode 2 from the relation between the vehicle speed and the throttle opening with reference to the high temperature map (S33), and if it should not be mode 2 it is determined whether it should be mode 3 from the relation between the vehicle speed and the throttle opening with reference to the high temperature map or the low temperature map (S34). If it is determined in S32 that it should be mode 1, it goes to S35 to cut off the second clutch device 3*b* and then to S40 to capacity control the first clutch device 3*a*.

If it is determined in S33 that the control method should be in mode 2 and in S34 that it should be mode 3, it goes to S36 to capacity control the second clutch device 3*b* and then to S40 to capacity control the first clutch device 3a. In addition if it is determined in S34 that it should not be mode 3, the control method goes to S37 to cut off the second clutch device 3b and then it is determined whether it should be mode 4 from the relation between the vehicle speed and the throttle opening with reference to the high temperature map or the low temperature map (S38).

If it is determined in S38 that the control method should be in mode 4, it is then determined whether the vehicle is braked (S39). If the vehicle is braked, the control method goes to S41 and performs standby control of the first clutch device 3a (i.e. performs the ineffective stroke reducing control; see FIG. 22). On the contrary if it is determined in S38 that the control method should not be in mode 4 and in S39 that the vehicle is not braked, the control method goes to S40 to perform the capacity control of the first clutch device 3a.

As shown in FIG. 20, the capacity control of the first clutch device 3a is performed by calculating a target transmitting torque of the first clutch device 3a (S42), then by calculating the coefficient of friction of the first clutch device 3a (S43), and then by calculating a target pressure of the first clutch device 3a based on the coefficient of friction obtained in S43 (S44), however, other calculations can also be used. The coefficient of friction in S43 can be calculated from a temperature of the hydraulic oil within the hydraulic oil chamber S1 for actuating the hydraulic piston P1 (i.e. temperature detected by the TM temperature sensor) and the slip ratio calculated by the slip ratio calculating device 25 for the first clutch device 3a.

Similarly as shown in FIG. 21 the capacity control of the second clutch device 3b can be performed by calculating a target transmitting torque of the second clutch device 3b (S45), then by calculating the coefficient of friction of the second clutch device 3b (S46), and by calculating a target pressure of the second clutch device 3b based on the coefficient of friction obtained in S46 (S47), however, other calculations can also be used. The coefficient of friction in S46 can be calculated from a temperature of the hydraulic oil within the hydraulic oil chamber S2 for actuating the hydraulic piston P2 (i.e. temperature detected by the TM temperature sensor) and the slip ratio calculated by the slip ratio calculating device 27 for the second clutch device 3b.

The standby control of the first clutch device 3a can be performed as shown in FIG. 22. That is, it is determined whether a predetermined time duration has elapsed since a time at which the target pressure of the first clutch device 3a was obtained (S48) (the formerly obtained target pressure of the first clutch device will be simply referred to as "PTCO"). If the predetermined time duration has not elapsed yet, the control method goes to S50 and determines the PTCO as a target pressure of the first clutch device of this time (PTC=PTCO).

On the other hand, if it is determined in S48 that the predetermined time duration has elapsed, the control method goes to S49 to start a feedback (FB) control and decides whether the slip ratio of the first clutch device 3a has increased. If it is determined in S49 that the slip ratio has increased the control method goes to S51 and determines a target pressure of the first clutch device (PTC) by reducing therefrom a predetermined set value ΔPTC (PTC=PTC− ΔPTC). If it is determined in S49 that the slip ratio has reduced it goes to S52 and determines a target pressure of the first clutch device (PTC) by adding thereto a predetermined set value ΔPTC (PTC=PTC+ΔPTC).

FIGS. 23-25 are timing charts showing conditions of the power transmitting apparatus described above, from the idle/neutral condition (control in which both the first and second clutch device 3a, 3b do not operate and are kept in neutral conditions when a vehicle is stopped by a braking operation) to the starting-up of a vehicle.

FIG. 23 shows a case in which the engine E is operating under a small throttle opening, such as idle, in which the driving force caused by the creep phenomenon of the torque converter 1 is transmitted to the wheel (driving wheel D) side and then a vehicle is started-up by actuating the second clutch device 3b with performing the capacity control of the first clutch device 3a when the braking operation is released.

FIG. 24 shows a case in which the engine E is operating under a middle throttle opening and in which the driving force caused by the creep phenomenon of the torque converter 1 is transmitted to the wheel (driving wheel D) side and then a vehicle is started-up by actuating both the first and second clutch device 3a, 3b with performing the capacity control of the first clutch device 3a when the braking operation is released.

FIG. 25 shows a case in which the engine E is operating under a large throttle opening in which the driving force caused by the creep phenomenon of the torque converter 1 is transmitted to the wheel (driving wheel D) side and then a vehicle is started-up by actuating the first clutch device 3a with performing the capacity control of the first clutch device 3a when the braking operation is released.

Since the slip ratio of the first clutch device 3a can be calculated from the difference or the ratio between the rotational speed measured by the input-side measuring device (speed sensor Y1) and the rotational speed measured by the output-side measuring device (speed sensor Y2), it is possible to assume the coefficient of friction (both the dynamic μ and static μ) of the first clutch device 3a based on the slip ratio and thus to easily and more precisely perform the clutch control of the first clutch device 3a.

In addition, where the slip ratio of the torque converter 1 is calculated from the difference or the ratio between the rotational speed measured by the driving source measuring means (speed sensor Y3) and the rotational speed measured by the input-side measuring means (speed sensor Y1), it is possible to obtain the amplifying condition of the torque converter 1 based on the slip ratio and thus to easily assume the transmitting torque.

Furthermore according to some embodiments, since the selecting device 4 can be used to selectively transmit the driving force of the driving source E to the wheels D through the power transmitting system of the torque converter 1 or for transmitting the driving force of the driving source E to the wheels D without through the power transmitting system of the torque converter 1 with properly selecting operation of the first clutch device 3a or the second clutch device 3b in accordance with conditions of the vehicle on its forward run including the starting-up, it is possible to suppress complication and size increase of the power transmitting apparatus, to improve the starting-up performance because of the torque amplifying function of the torque converter, and also to improve power transmitting efficiency during the steady run of vehicle.

Thus, in some embodiments, it is possible to eliminate the lock-up clutch of the prior art. In addition since the speed sensors Y2, Y3 (of course also Y4) can be those that are conventionally and popularly used in various vehicles such as automobiles, it is possible to reduce the manufacturing cost of the power transmitting apparatus by adopting these conventional speed sensors.

In addition, since the first and second driving shafts 5, 6 are coaxially arranged, it is possible to reduce the whole size of the power transmitting apparatus as compared with a structure in which they are arranged in parallel with each other.

Furthermore, since the second driving shaft 6 is connected to the driving source (engine E) via the damping mechanism 7 for attenuating the torque variation, it is possible to reduce vibrations of the engine E transmitted to the second clutch device 3b.

Furthermore since the selecting device 4 enables to actuate both the first and second clutch device 3a, 3b in accordance with the condition of a vehicle (e.g. condition of (e) torque separated starting-up mode in a table of FIG. 5) and to transmit the driving force to the wheels (driving wheels D) at a predetermined ratio of the driving force through the power transmitting system of the torque converter 1 and the driving force without through the power transmitting system of the torque converter 1, it is possible to easily adjust the driving force transmitted to the driving wheels D. Under such a circumstances it is preferable to vary the ratio of the driving force between a case in which the torque amplifying function of the torque converter 1 is frequently utilized and a case in which the power transmitting efficiency is improved by avoiding the slippage of the torque converter 1.

On the other hand since both the first and second clutch device 3a, 3b are not operated and the neutral condition is kept when a vehicle is in the stopped condition by an operation of brake (e.g. condition of (a) idle/neutral mode in a table of FIG. 5), it is possible to improve the fuel consumption. In addition since the power transmitting apparatus is provided with a third clutch device 8 for transmitting the driving force of the engine E to the driving wheels D through the power transmitting system of the torque converter 1 and the selecting device 4 can be configured to exclusively actuate the third clutch device 8 in the reverse mode of a vehicle, only the power transmitting system through the power transmitting system of the torque converter 1 is utilized and thus an increase of size of the power transmitting apparatus can be avoided.

In addition, since the first and second clutch device 3a, 3b and two hydraulic pistons P1, P2 corresponding respectively thereto, are contained within the same box member 17 and the first clutch device 3a or the second clutch device 3b can be operated in accordance with driver's selection by controlling the hydraulic pressure for actuating the hydraulic pistons P1, P2, it is possible to further simplify the whole structure of the power transmitting apparatus and reduce the size thereof.

In some embodiments, the variable speed unit A is a continuously variable speed unit 24 (e.g. CVT: Continuously Variable Transmission) shown in FIG. 10. In this case the continuously variable speed unit 24 can be arranged between the second clutch device 3b of the clutch mechanism 3 and the driving wheels D in a power transmitting system from the engine E of a vehicle to the driving wheels D.

Such a continuously variable speed unit 24 can comprise two pulleys Q1 and Q2 and a belt V extending therebetween and can achieve a desired change in speed by independently changing diameters of the pulleys Q1 and Q2 on which the belt V runs by a hydraulic pressure control circuit 23. The continuously variable speed unit 24 can further comprise a CVT ECU 22 electrically connected to a brake switch of a brake pedal, a position sensor of a shifting lever, an engine ECU (not shown) etc. and the hydraulic control circuit 23 is further controlled by the CVT ECU 22. The hydraulic pistons P1-P3 are also selectively controlled by the hydraulic pressure control circuit 23.

In embodiments where a continuously variable speed unit 24 is interposed between the second clutch device 3b of the clutch mechanism 3 and the driving wheels D in the power transmitting system from the engine E of the vehicle to the driving wheels D, it is possible to use in the second clutch device 3b both the clutch for advancing a vehicle and the clutch for transmitting the driving force to the driving wheels D without through the power transmitting system of the torque converter 1. A reference character F in the figure denotes a differential gear of a vehicle.

Although the present inventions are described above with reference to certain embodiments of a power transmission system of a vehicle, the present inventions are not limited to those embodiments described and shown herein. For example, power transmitted apparatuses embodying one or more of the present inventions can be constructed so that the selecting device 4 can set each mode of (a)-(f) corresponding to the inclined angle of a vehicle in addition to those shown in a diagram of FIG. 5. In addition, although it is shown as a preferable embodiment that the first and second driving shafts 5 and 6 are coaxially arranged each other, they may be separately arranged in a parallel relation each other.

Furthermore, although an embodiment is been described above where the driving force of the engine E is transmitted to the driving wheels D through the power transmitting system of the torque converter 1 by actuating only the third clutch device 8 on reverse of a vehicle, it is possible to construct the power transmitting apparatus so that a fourth clutch device for transmitting the driving force of the engine E to the driving wheels D without through the power transmitting system of the torque converter 1 is added to the apparatus and either one of the third clutch device 8 or the fourth clutch device may be properly selected in accordance with a condition of a vehicle on its reverse.

In the illustrated embodiment, although it is shown that the driving source is the engine E, the present inventions are not limited to such engines and other driving sources can also be used e.g. an electric motor used in an electric car and a hybrid car. Furthermore, although it is shown in the illustrated embodiment that the selecting device 4 is formed in the ECU, it may be formed in a separately arranged microcomputer.

What is claimed is:

1. A power transmitting apparatus for selectively transmitting power from a driving source of a vehicle to wheels of the vehicle, comprising:

a torque converter having a torque amplifying function;

a clutch mechanism comprising a first clutch device configured to transmit a driving force of the driving source to the wheels through the torque converter so as to move the vehicle and a second clutch device configured to transmit the driving force of the driving source to the wheels without the power transmitting system of the torque converter so as to move the vehicle wherein the first clutch device includes at least two clutches;

a selecting device configured to selectively operate the first and second clutch devices so as to transmit the driving force of the driving source to the wheels through a power transmitting system of the torque converter and for transmitting the driving force of the driving source to the wheels without the power transmitting system of the torque converter by operating the first clutch device and the second clutch device in accordance a plurality of different modes of operation of the vehicle, at least one of the modes being a starting mode;

an input-side measuring device configured to measure an input-side rotational speed of the first clutch device;

an output-side measuring device configured to measure an output-side rotational speed of the first clutch device; and a slip ratio calculating device for the first clutch device configured to calculate a slip ratio of the first clutch device based on at least one of the difference or the ratio between the rotational speed measured by the input-side measuring device and the rotational speed measured by the output-side measuring device;

wherein a power transmitting system from the driving source of the vehicle to the wheels comprise the torque converter and a transmission, the clutch mechanism and a variable speed unit being arranged within the transmission, and wherein the first clutch device being operable with capacity control, the capacity control of the first clutch device being performed based on the slip ratio calculated by the slip ratio calculating device for the first clutch device, the first clutch device being arranged downstream of the torque converter in the power transmitting system.

2. The power transmitting apparatus of claim 1, wherein the operation of the second clutch device is prevented at low temperatures.

3. The power transmitting apparatus of claim 1, wherein the operation of the second clutch device is limited at low temperatures.

4. The power transmitting apparatus of claim 1 further comprising a hydraulic piston configured to move under hydraulic action of a hydraulic oil to change the first clutch between an engaged state and a disengaged state, and wherein the selecting device is configured to control the hydraulic oil of the hydraulic piston based on the slip ratio calculated by the slip ratio calculating device for the first clutch device.

5. The power transmitting apparatus of claim 4 wherein the selecting device is configured to maintain the first and second clutch devices in a disengaged state in a neutral condition when the vehicle is stopped by operation of a brake, and wherein the selecting device is also configured to transmit a driving force caused by a creep phenomenon of the torque converter to the wheels by operating the first clutch device with hydraulic oil acting on the hydraulic piston when the braked condition is released.

6. The power transmitting apparatus of claim 5 wherein the selecting device is configured to perform an ineffective stroke reducing control operation in which the hydraulic piston is moved in an engagement direction until just before the driving force is transmitted to the first clutch device when a vehicle is stopped by operating the brake.

7. The power transmitting apparatus of claim 6 wherein the selecting device is configured to perform the ineffective stroke reducing control operation based on the slip ratio calculated by the slip ratio calculating device for the first clutch device.

8. The power transmitting apparatus of claim 1 further comprising:
a driving source measuring device configured to measure the rotational speed of the driving source of a vehicle, and a slip ratio calculating device for the torque converter configured to calculate a slip ratio of the torque converter based on a difference or the ratio between the rotational speed measured by the driving source measuring device and the rotational speed measured by the input-side measuring device.

9. The power transmitting apparatus of claim 8 further comprising a hydraulic piston configured to change the first clutch between an engaged state and a disengaged state, and wherein the selecting device is configured to control hydraulic oil of the hydraulic piston based on at least one of the slip ratio calculated by the slip ratio calculating device for the first clutch device and the slip ratio calculating device for the torque converter.

10. The power transmitting apparatus of claim 9 wherein the selecting device is configured to maintain the first and second clutch devices in a disengaged state in a neutral condition when the vehicle is stopped by operation of a brake, and wherein the selecting device is also configured to transmit a driving force caused by a creep phenomenon of the torque converter to the wheels by operating the first clutch device with hydraulic oil acting on the hydraulic piston when the braked condition is released.

11. The power transmitting apparatus of claim 10 wherein the selecting device is configured to perform an ineffective stroke reducing control operation in which the hydraulic piston is moved in an engagement direction until just before the driving force is transmitted to the first clutch device when a vehicle is stopped by operating the brake.

12. The power transmitting apparatus of claim 11 wherein the selecting device is configured to perform the ineffective stroke reducing control operation based on at least one of the slip ratio calculated by the slip ratio calculating device for the first clutch device and the slip ratio calculating device for the torque converter.

13. A power transmitting apparatus for selectively transmitting power from a driving source of a vehicle to wheels of the vehicle, comprising:
a torque converter having a torque amplifying function;
a clutch mechanism including a first clutch device configured to transmit a driving force of the driving source to the wheels through the torque converter so as to move the vehicle and a second clutch device configured to transmit the driving force of the driving source to the wheels without the power transmitting system of the torque converter so as to move the vehicle wherein the first clutch device includes at least two clutches;
a selecting device configured to selectively operate the first and second clutch devices so as to transmit the driving force of the driving source to the wheels through the power transmitting system of the torque converter and for transmitting the driving force of the driving source to the wheels without the power transmitting system of the torque converter by operating the first clutch device and the second clutch device in accordance a plurality of different modes of operation of the vehicle, at least one of the modes being a starting mode;
an input-side measuring device configured to measure an input-side rotational speed of the second clutch device;
an output-side measuring device configured to measure an output-side rotational speed of the second clutch device; and
a slip ratio calculating device for the second clutch device configured to calculate a slip ratio of the second clutch device based on at least one of the difference or the ratio between the rotational speed measured by the input-side measuring device for the second clutch device and the rotational speed measured by the output-side measuring device for the second clutch device;
wherein a power transmitting system from the driving source of the vehicle to the wheels comprises the torque converter and a transmission, the clutch mechanism and a variable speed unit being arranged within the transmission, and wherein the second clutch device being operable with capacity control, the capacity control of the second clutch device being performed based on the slip ratio calculated by the slip ratio calculating device for the second clutch device, the first clutch device being arranged downstream of the torque converter in the power transmitting system.

14. The power transmitting apparatus of claim 13 further comprising a hydraulic piston configured to move under hydraulic action of a hydraulic oil to change the second clutch device between an engaged state and a disengaged state, wherein the selecting device is configured to control the hydraulic oil of the hydraulic piston based on the slip ratio calculated by the slip ratio calculating device for the second clutch device.

15. The power transmitting apparatus of claim 13, wherein the operation of the second clutch device is prevented at low temperatures.

16. The power transmitting apparatus of claim 13, wherein the operation of the second clutch device is limited at low temperatures.

* * * * *